(12) United States Patent
Garti et al.

(10) Patent No.: US 10,138,646 B2
(45) Date of Patent: Nov. 27, 2018

(54) SUBMERGED ROBOT WITH LEARNING CAPABILITIES

(71) Applicants: Efraim Garti, Zichron Yaakov (IL); Itamar Cohen, Giv'at Yoav (IL); Oz Eisner, Kibbutz Yizrael (IL)

(72) Inventors: Efraim Garti, Zichron Yaakov (IL); Itamar Cohen, Giv'at Yoav (IL); Oz Eisner, Kibbutz Yizrael (IL)

(73) Assignee: MAYTRONICS LTD., Kibbutz Yizreal (IL)

( * ) Notice: Subject to any disclaimer, the term of this patent is extended or adjusted under 35 U.S.C. 154(b) by 1064 days.

(21) Appl. No.: 13/731,118

(22) Filed: Dec. 31, 2012

(65) Prior Publication Data

US 2014/0096329 A1 Apr. 10, 2014

Related U.S. Application Data

(63) Continuation-in-part of application No. 12/482,129, filed on Jun. 10, 2009, now Pat. No. 8,341,789.

(60) Provisional application No. 61/129,225, filed on Jun. 12, 2008.

(51) Int. Cl.
| | |
|---|---|
| *E04H 4/16* | (2006.01) |
| *H02K 5/12* | (2006.01) |
| *H02K 7/11* | (2006.01) |
| *H02K 11/38* | (2016.01) |
| *H02K 5/132* | (2006.01) |
| *H02K 7/116* | (2006.01) |
| *H02K 7/18* | (2006.01) |

(52) U.S. Cl.
CPC ............ *E04H 4/1654* (2013.01); *H02K 5/12* (2013.01); *H02K 7/11* (2013.01); *H02K 11/38* (2016.01); *H02K 5/132* (2013.01); *H02K 7/116* (2013.01); *H02K 7/1823* (2013.01)

(58) Field of Classification Search
CPC ....... E04H 4/1654; E04H 4/1663; E04H 4/16; E04H 4/1636; E04H 4/1609; E04H 4/1618; H02K 5/15; H02K 7/11
USPC .................................................... 15/1.7, 319
See application file for complete search history.

(56) References Cited

U.S. PATENT DOCUMENTS

| | | | | |
|---|---|---|---|---|
| 3,319,093 A | * | 5/1967 | Abdul | 310/50 |
| 4,920,465 A | * | 4/1990 | Sargent | 362/96 |
| 4,939,806 A | * | 7/1990 | Supra | 15/1.7 |
| 5,001,800 A | * | 3/1991 | Parenti et al. | 15/1.7 |
| 5,337,434 A | * | 8/1994 | Erlich | 15/1.7 |
| 5,434,031 A | * | 7/1995 | Nakao et al. | 430/191 |
| 5,435,031 A | * | 7/1995 | Minami et al. | 15/1.7 |
| 5,507,058 A | * | 4/1996 | Minami et al. | 15/1.7 |
| 5,542,141 A | * | 8/1996 | Albright | 15/1.7 |
| 6,039,886 A | * | 3/2000 | Henkin et al. | 210/776 |

(Continued)

*Primary Examiner* — Robert Scruggs
(74) *Attorney, Agent, or Firm* — Reches Patents

(57) ABSTRACT

A suction-powered pool cleaning robot that may include a fluid outlet, adapted for connection to a suction hose; a fluid inlet, with a fluid path between the fluid inlet and the fluid outlet; a turbine at least partially disposed within the fluid path so as to extract energy from flow of fluid through the fluid path; an electrical generator for providing power thereto and adapted to be driven by the turbine; a sensor arranged to generate rotation information indicative of a speed of rotation of the turbine; and an electronic controller that is arranged to control an operation of the suction-powered pool cleaning robot in response to at least the rotation information.

8 Claims, 27 Drawing Sheets

(56) References Cited

U.S. PATENT DOCUMENTS

| | | | |
|---|---|---|---|
| 6,299,699 B1* | 10/2001 | Porat et al. | 134/6 |
| 6,652,742 B2* | 11/2003 | Henkin et al. | 210/167.16 |
| 6,663,011 B1* | 12/2003 | Entleutner | 237/12.1 |
| 7,520,282 B2* | 4/2009 | Stoltz | 134/45 |
| 7,658,375 B2* | 2/2010 | Wong et al. | 271/164 |
| 7,849,547 B2* | 12/2010 | Erlich et al. | 15/1.7 |
| 2004/0231075 A1* | 11/2004 | Stoltz | 15/1.7 |
| 2008/0060984 A1* | 3/2008 | Henkin et al. | 210/143 |
| 2008/0087299 A1* | 4/2008 | Erlich et al. | 134/6 |
| 2009/0045110 A1* | 2/2009 | Garti | 210/167.16 |
| 2011/0314617 A1* | 12/2011 | Van Der Meijden et al. | 15/1.7 |

\* cited by examiner

SUBMERGED ROBOT WITH LEARNING CAPABILITIES

RELATED APPLICATIONS

This application is a continuation in part of U.S. patent application Ser. No. 12/482,129 filing date Jun. 10, 2009.

FIELD OF THE INVENTION

This invention relates to pool cleaning robots, and particularly to those which are powered by an externally supplied suction.

BACKGROUND OF THE INVENTION

Suction powered pool cleaning robots are adapted for use for cleaning a pool while being powered by an external suction (or pump) and filter system. The robot is designed to traverse, e.g., the bottom and/or side surfaces of the pool when attached to a hose of the suction system. Water which is drawn through the hose is typically filtered and returned to the pool. Thus, a main function of the robot is to carry the hose about the pool surfaces to be cleaned. Such robot s may scan along a predetermined path or pre determined direction changes based on arrangement of mechanical elements.

SUMMARY OF THE INVENTION

There may be provided a suction-powered pool cleaning robot that may include a fluid outlet, adapted for connection to a suction hose; a fluid inlet, with a fluid path between the fluid inlet and the fluid outlet; a turbine at least partially disposed within the fluid path so as to extract energy from flow of fluid through the fluid path; an electrical generator for providing power thereto and adapted to be driven by the turbine; at least one sensor that may be arranged to generate sensor signals indicative of propagation parameters of the suction-powered pool cleaning robot; and an electronic controller that may be arranged to learn propagation patterns of the suction-powered pool cleaning robot and control an operation of the suction-powered pool cleaning robot in response to the sensor signals and the propagation patterns. Propagation parameters may include suction, speed of propagation, direction of propagation, rotational speed of the turbine, timing information and the like.

The propagation patterns may include speed of movement between walls, speed of movement when attempting to climb a wall, timing information related to inter-wall movement, timing information related to obstacle crossing, climbing wall attempts, rotations and change of direction of the robot, turbine rotation speed at different situations (obstacle free bottom surface of pool propagation, obstacle, wall climbing, and the like). The propagation patterns may include an expected time required to cross between walls of the pool, an expected time required to rotate the pool cleaning robot suction-powered pool cleaning robot, and even an expected time that passes from an initial contact of pool cleaning robot suction-powered pool cleaning robot with a wall of the pool to a propagation of the suction-powered pool cleaning robot away from the wall The electronic controller may be arranged to calculate and update the propagation patterns in response to values of the sensor signals.

The at least a portion of the sensor signals provide rotation information indicative of a speed of rotation of the turbine.

The at least a portion of the sensor signals provide suction information indicative of a suction applied via the fluid outlet.

The electronic controller may be arranged to control the operation of the suction-powered pool cleaning robot within a large range of turbine rotational speeds.

The electronic controller may be arranged to provide propagation pattern data to a transceiver of the suction-powered pool cleaning robot for a transmittal of the propagation pattern data by the transceiver.

According to one aspect of the present invention, there is provided a suction-powered pool cleaning robot that may include a fluid outlet, adapted for connection to a suction hose; a fluid inlet, with a fluid path between the fluid inlet and the fluid outlet; a turbine at least partially disposed within the fluid path so as to extract energy from flow of fluid through the fluid path; an electrical generator for providing power thereto and a driving gear train both adapted to be driven by the turbine; a sensor arranged to generate rotation information indicative of a speed of rotation of the turbine; and an electronic controller that may be arranged to control an operation of the suction-powered pool cleaning robot in response to at least the rotation information.

The electronic controller may be arranged to trigger a rotation of the suction-powered pool cleaning robot if the rotation information indicates that the suction-powered pool cleaning robot attempts to climb a wall of the pool.

The electronic controller may be arranged to trigger the rotation of the suction-powered pool cleaning robot by triggering a movement of a flexible axle that selects which gear out of a pair of gears will drive a driving wheel of the suction-powered pool cleaning robot, wherein the pair of gears rotate at opposite directions.

The electronic controller may be arranged to determine that the rotation information indicates that the suction-powered robot attempts to climb the wall if a value of the rotation information maintains substantially constant during a period that is longer than a maximal expected time required for the suction-powered pool cleaning robot to cross the pool.

The electronic controller may be arranged to calculate the maximal expected time required for the suction-powered pool cleaning robot to cross the pool.

The electronic controller may be arranged to determine that the rotation information indicates that the suction-powered pool cleaning robot attempts to climb the wall if the rotation information indicates that the rotational speed of the turbine is below an expected inter-wall propagation rotational value for at least a certain period.

The electronic controller may be arranged to update the expected inter-wall propagation rotational value in response to values of the rotation information obtained during one or more time windows.

The electronic controller may be arranged to update the expected inter-wall propagation rotational value in response to samples of the rotation information that represents changes in the rotational speed of the turbine.

The electronic controller may be arranged to trigger a rotation of the suction-powered pool cleaning robot if the rotation information indicates that the suction-powered pool cleaning robot is stuck.

The electronic controller may be arranged to trigger an alert indicating that the suction-powered pool cleaning robot suction-powered pool cleaning robot is stuck.

The suction-powered pool cleaning robot suction-powered pool cleaning robot may include an inclination sensor that may be arranged to sense an inclination of the suction-powered pool cleaning robot suction-powered pool cleaning robot and generate inclination information, wherein the electronic controller may be arranged to control the operation of the suction-powered pool cleaning robot suction-powered pool cleaning robot in response to at least the rotation information and the inclination information.

The suction-powered pool cleaning robot suction-powered pool cleaning robot may include a suction sensor that may be arranged to generate suction information indicative of suction applied via the suction hose.

The electrical controller may be arranged to update an expected inter-wall propagation rotational value in response to the suction information.

The electrical controller may be arranged to update the expected inter-wall propagation rotational value in response an expected decline of the suction resulting from clogging of a filter of a device that applies the suction.

The electrical controller may be arranged to compare the suction information and the rotation information and evaluate a status of the suction-powered pool cleaning robot suction-powered pool cleaning robot based upon a result of the comparison.

The generator is a brushless generator that is without a Hall effect circuit.

The generator may include a rotor that is supported by one or more brushless bearings.

The generator may include a rotor that is rotated in a contactless manner.

The axle of the rotor is coupled to a multiple-magnet element; wherein the multiple-magnet element is magnetically coupled to a driving gear.

The distance between magnets of a rotor of the generator and coils of a stator of the generator may be smaller than a radius an axle of the rotor.

The distance between magnets of a rotor of the generator and coils of a stator of the generator may be smaller than 5 millimeters.

The generator may be a three-phase brushless alternating current generator and is wired to a voltage rectifier in a star configuration.

The turbine may be a cross flow turbine.

The cross flow turbine may include multiple blades, wherein openings defined between any pair of blades are not smaller than the input inlet.

The cross flow turbine may include multiple curved blades.

The suction-powered pool cleaning robot suction-powered pool cleaning robot may include a flexible axle that is movable between different first and second positions such as to cause the suction-powered pool cleaning robot to change a direction of propagation.

The suction-powered pool cleaning robot suction-powered pool cleaning robot may include a hydraulic circuit that selectively provides suction, wherein a provision of suction causes the flexible axle to move to a first position and wherein a lack of provision of the suction to a diaphragm allows the flexible axle to move to the second position.

The hydraulic circuit may be arranged to receive suction applied via the fluid outlet.

BRIEF DESCRIPTION OF THE DRAWINGS

In order to understand the invention and to see how it may be carried out in practice, an embodiment will now be described, by way of a non-limiting example only, with reference to the accompanying drawings, in which.

DETAILED DESCRIPTION OF EMBODIMENTS

Figure 1A:
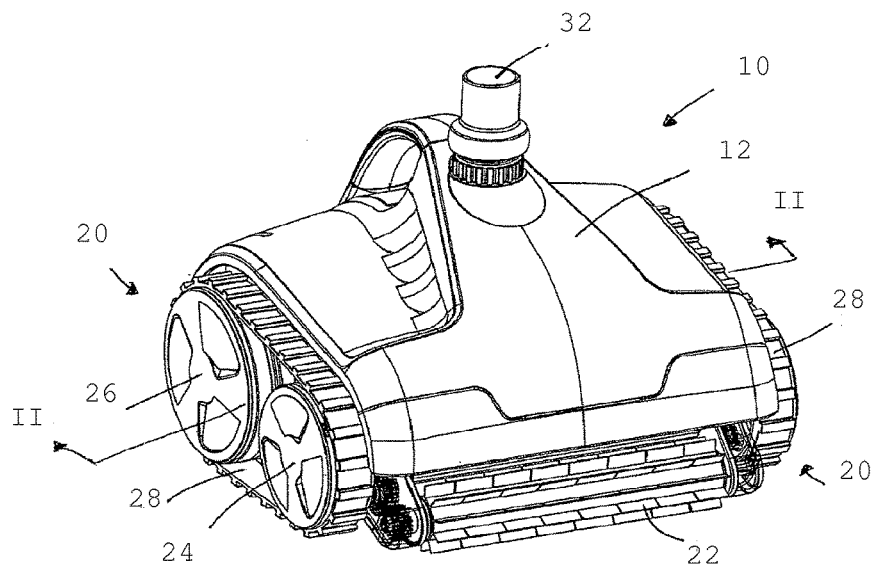
FIGS. 1A and 1B are top and bottom perspective views, respectively, of a robot according to the present invention.
Figure 1B:
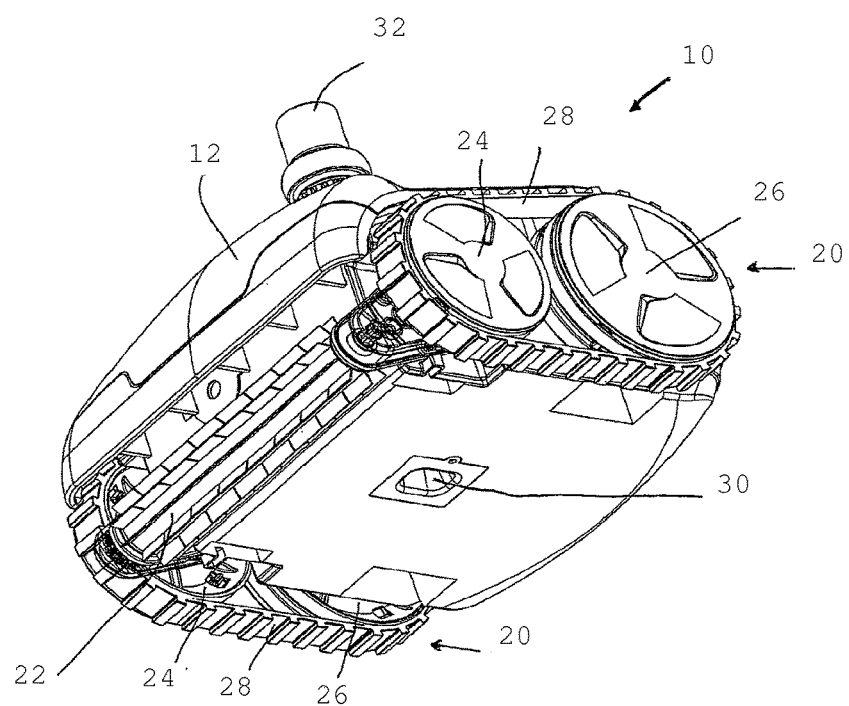
Figure 1C:
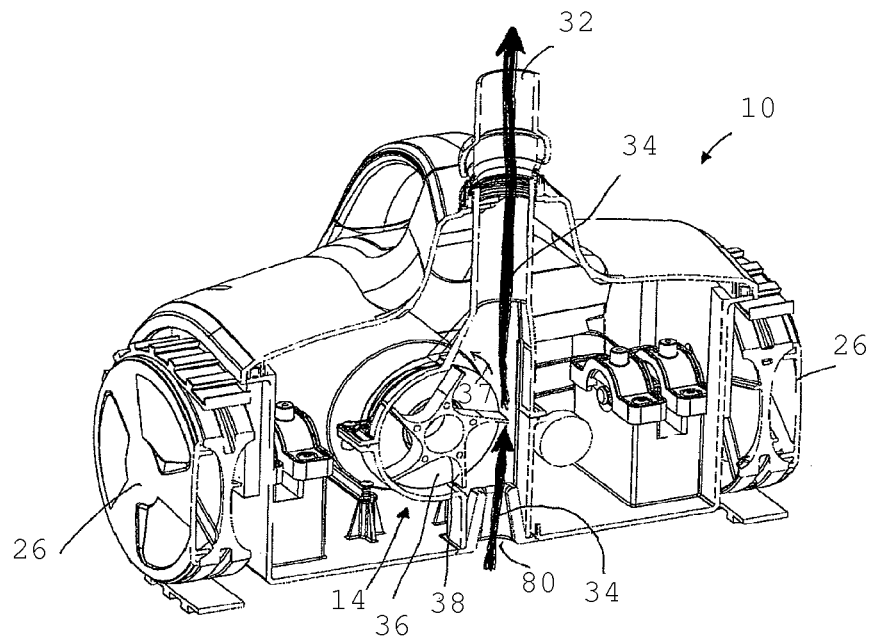
FIG. 1C is a cross-section view of the robot, taken along line II-II in FIG. 1A.
Figure 1D:
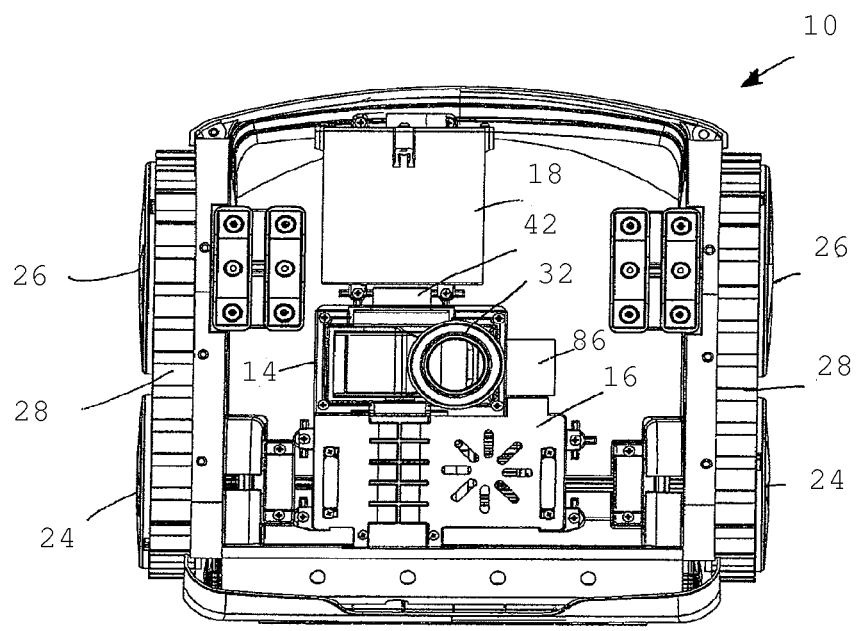
FIG. 1D is a top view of the robot, with a cover portion of a housing thereof removed.

As illustrated in FIGS. 1A through 1D, there is provided a suction-powered pool cleaning robot, which is generally indicated at 10. The robot comprises a main housing 12, which contains therewithin a water flow unit 14, a drive unit 16, and a sealed control unit 18. The robot 10 comprises, exterior to the housing 12, two track assemblies 20 on opposite sides of the housing, and a brushwheel 22. Each track assembly comprises a drive wheel 24, a free wheel 26, and a track 28 thereabout.

The water flow unit 14 is designed to be connected to an external suction source (not illustrated), which draws water and debris from the bottom of the pool and filters it before returning it to the pool. Thus, the flow unit 14 comprises a fluid inlet 30, adapted to be disposed, during use, facing and substantially adjacent the pool floor, and a fluid outlet 32, which is adapted to be attached to a suction hose (not illustrated) which is in fluid communication with the external suction source. A fluid path, indicated by arrows 34 and through which the water drawn through the inlet 30 passes before exiting via the outlet 32 passes, is defined between the inlet and the outlet.

Figure 2:
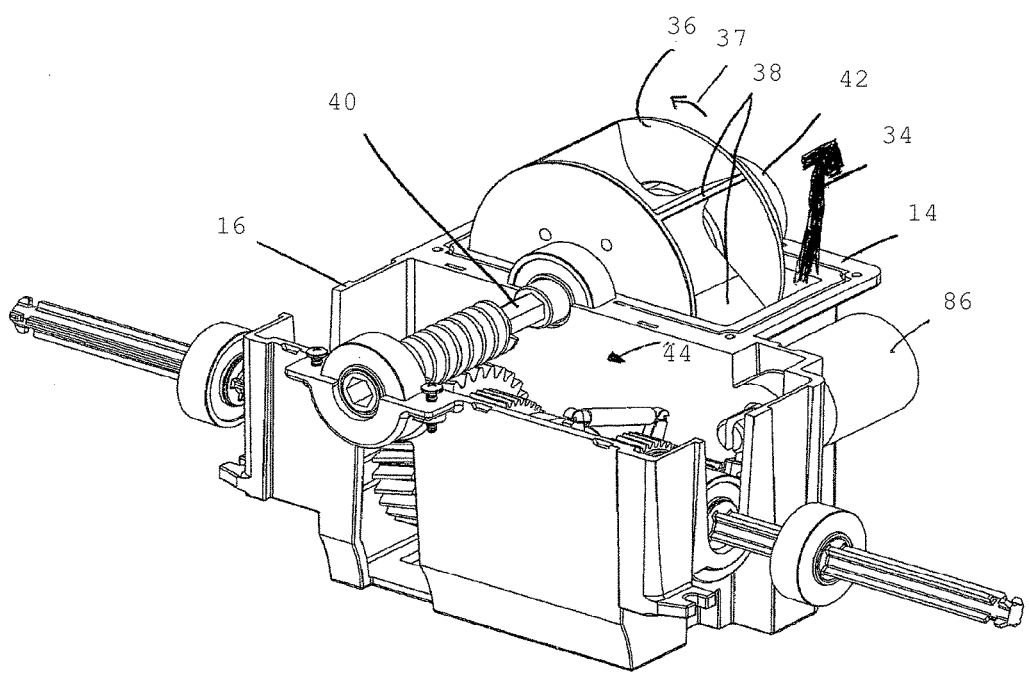
FIG. 2 is a perspective view of a water flow unit and a drive unit of the robot, with their respective covers removed.

As illustrated in FIG. 2, the flow unit 14 further comprises a turbine 36, which is disposed such that some of its blades 38 are disposed within the fluid path. Water flowing from the inlet 30 to the outlet 32 rotates the turbine 36 in a working direction, as indicated by arrows 37. The turbine 36 is associated with two shafts, e.g., coupled thereto or integral therewith, projecting from both sides thereof. A mechanical drive shaft 40 projects into the drive unit 16. A power shaft 42 projects toward the control unit 18. Further constructional and functional considerations of the two shafts 40, 42 will be described below.

Figure 3A:
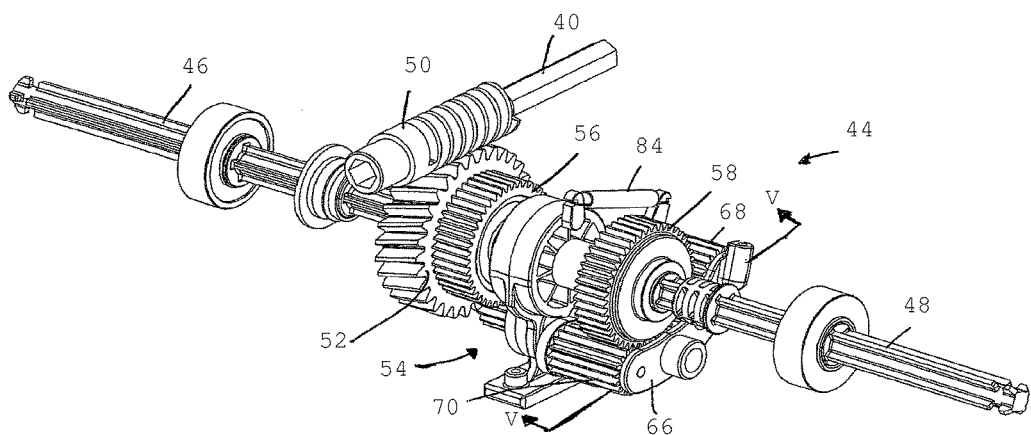
FIGS. 3A and 3B are front and rear perspective views, respectively, of a drive mechanism of the robot.
Figure 3B:
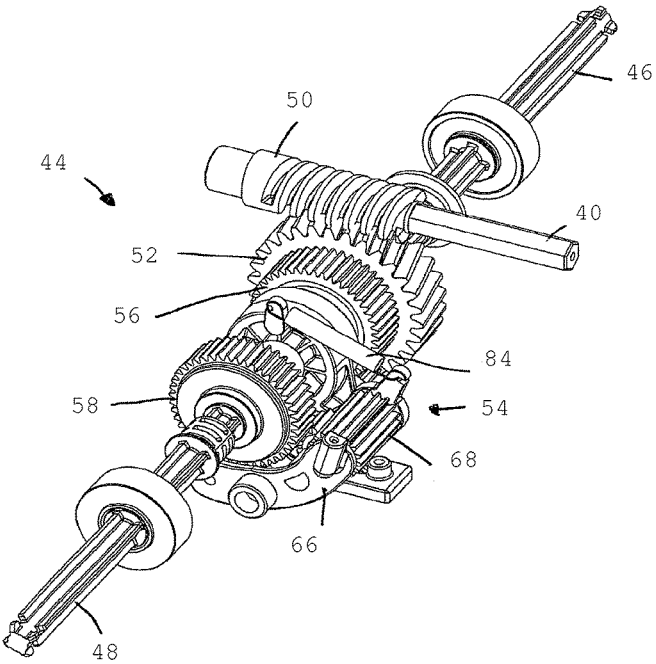

As best seen in FIGS. 3A and 3B (with the mechanical drive shaft 40 included for reference), the drive unit 16 comprises a drive mechanism, which is generally indicated at 44 and is designed to use mechanical motion provided by the mechanical drive shaft 40 to provide angular motion to (i.e., rotate) the drive wheels 24 of the track assemblies 20. Each drive wheel 24 may be rotated in the same angular direction, resulting in the robot 10 being driven in a substantially straight path, or in opposite angular directions, resulting in the robot 10 pivoting. Thus, the drive mechanism 44 comprises two axles: a constant axle 46, which always rotates in the same angular direction when the turbine rotates in its working direction, and a reversible axle 48, which may rotate in either direction when the turbine rotates in its working direction, as will be explained below. Each of the axles 46, 48 is mounted with and drives one of the drive wheels 24.

The constant axle 46 and its associated drive wheel 24 are driven directly by the mechanical drive shaft 40 of the turbine 36. The mechanical drive shaft 40 comprises a worm 50, either mounted thereon or formed integrally therewith. A worm gear 52 (e.g., a helical gear) is mounted on the constant axle 46 to cooperate with the worm 50 for rotating the constant axle upon rotation of the mechanical drive shaft 40. It will be appreciated that by providing this direct drive relationship between the constant axle 46 and the mechanical drive shaft 40, any reduction in speed of the robot caused by an external source will result in a reduction in speed of the turbine, irrespective of the rate of flow of water through the fluid path. The significance of this will be explained below.

The reversible axle 48 is driven by a gear train, generally indicated at 54, and which comprises first and second transmission gears 56, 58, each mounted to one of the constant axle 46 and the reversible axle 48, respectively, such that it rotates in tandem therewith, a transmission rod 60 (illustrated in hidden lines in FIG. 4) with first and second rod gears 62, 64 mounted thereto, and a reversing mechanism 66. The first transmission gear 56 may be formed integrally with the worm gear 52.

Figure 4:
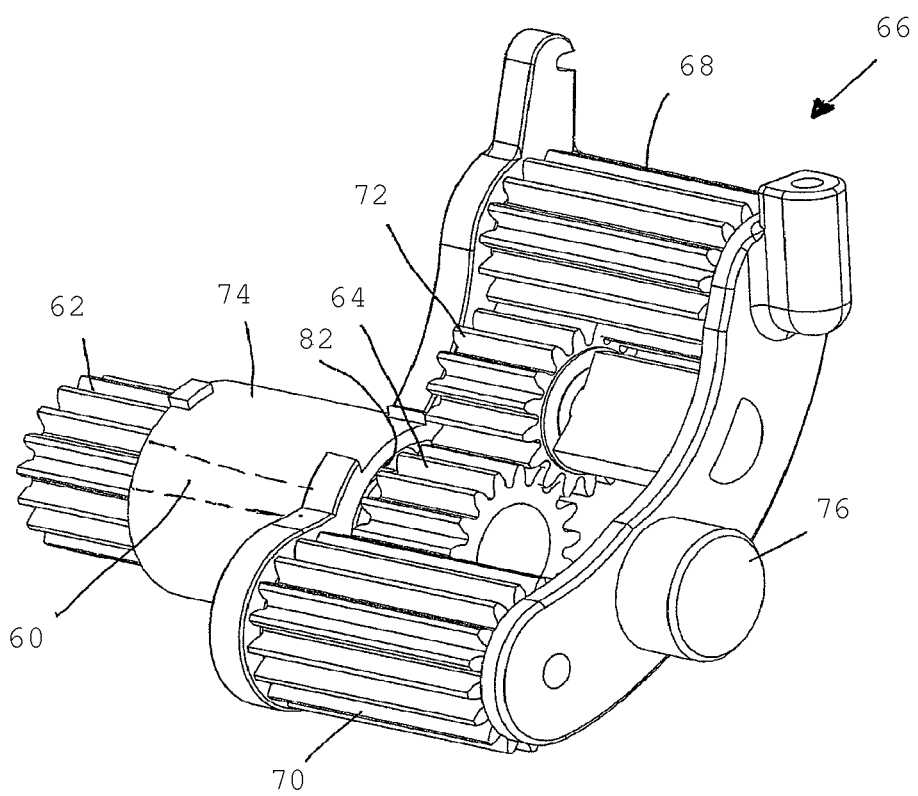
FIG. 4 is a detailed view of a portion of a gear train of the drive mechanism illustrated in FIGS. 3A and 3B.

As best illustrated in FIG. 4, the reversing mechanism 66 is formed as an arcuate rocker mechanism, with four gears arranged parallely along its length. The extreme gears constitute first and second selection gears 68, 70. One of the interior gears of the reversing mechanism 66 is the second rod gear 64. The other interior gear is a reversing gear 72. The reversing mechanism 66 comprises first and second rocker supports 74, 76, formed as round projections and disposed coaxially to one another, which are used to support and balance the reversing mechanism 66. Portions which are integrally formed with or rigidly attached to the drive unit 16 on either side of the reversing mechanism 66 are formed with round apertures adapted to snuggly receive therein the rocker supports 74, 76, while still allowing them to rotate therein (e.g., a rolling element bearing, not illustrated, may be provided within each aperture). The first rocker support 74 is formed with a through-going aperture 82 adapted to rotatably receive therein the transmission rod 60 and/or the second rod gear 64. (The through-going aperture 82 may be formed with two different internal diameters so as to rotatably receive therein both the transmission rod 60 and the second rod gear 64.) Thus, the axis about which the reversing mechanism 66 pivots is the same axis about which the second rod gear 64 rotates.

Figure 5A:
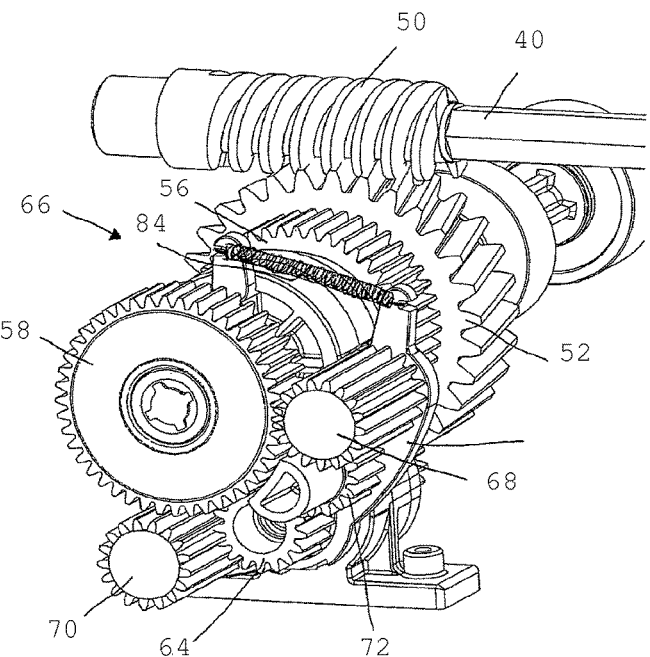
FIGS. 5A and 5B are cross-sectional perspective views of the drive unit, illustrating a reversing mechanism thereof in its respective first and second operating positions, taken along line V-V in FIG. 3A.

A biasing member, such as a spring 84, is provided to keep the reversing mechanism 66, in the absence of any external force, in its first operating position, i.e., pivoted such that the first selection gear 68 engages (i.e., is meshed with) the second transmission gear 58, as illustrated in FIG. 5A.

As there are four gear meshings in the gear train between the first and second transmission gears 56, 58 when the reversing mechanism 66 is in its first operating position (a first between the first transmission gear and the first rod gear 62; a second between the second rod gear 64, which rotates with the first rod gear, and the reversing gear 72; a third between the reversing gear and the first selection gear 68; a fourth between the first selection gear and the second transmission gear), both transmission gears, and thus both the constant axle 46 and the reversible axle 48, rotate in the same direction when the reversing mechanism 66 is in its first operating position. (It is well known that each meshing between two gears such as spur gears results in the two gears rotating in opposite directions. Thus, an odd number of meshings between two gears results in the gears rotating in opposite directions, while an even number of meshings between two gears results in the gears rotating in the same direction.)

Figure 5B:
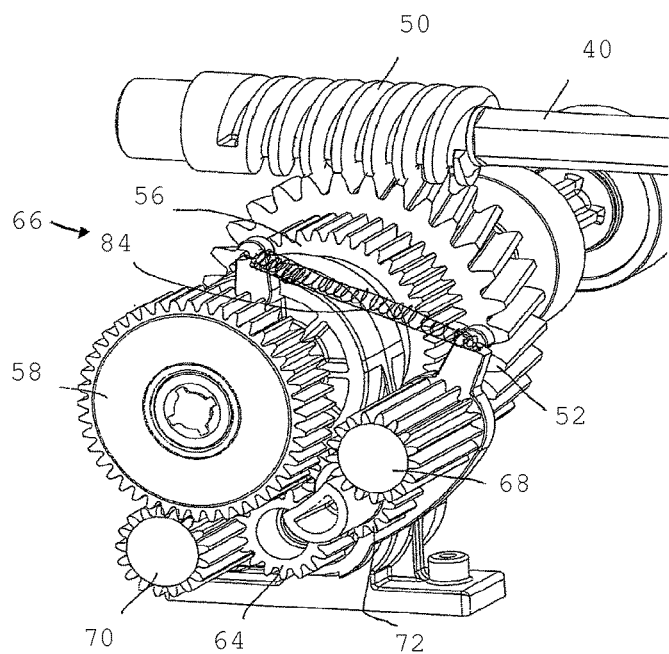

When the reversing mechanism 66 is in its second position, as illustrated in FIG. 5B, the second selection gear 70 engages the second transmission gear 58. As there are three gear meshings in the gear train between the first and second transmission gears 56, 58 when the reversing mechanism 66 is in its second operating position (a first between the first transmission gear and the first rod gear 62; a second between the second rod gear 64, which rotates with the first rod gear, and second selection gear 70; a third between the second selection gear and the second transmission gear), the transmission gears, and thus both the constant axle 46 and the reversible axle 48, rotate in opposite directions when the reversing mechanism 66 is in its second operating position. In this way turning of the robot (i.e., pivoting about a vertical axis) is enabled.

Figure 6A:
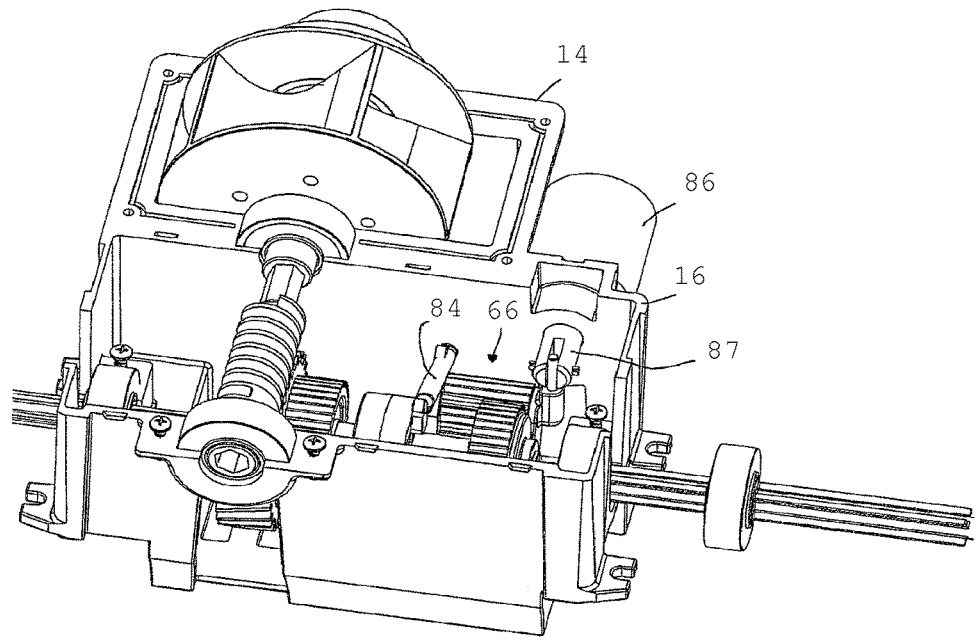
FIGS. 6A and 6B are top perspective views of the water flow unit and drive unit, with the reversing mechanism in its respective first and second operating positions.
Figure 6B:
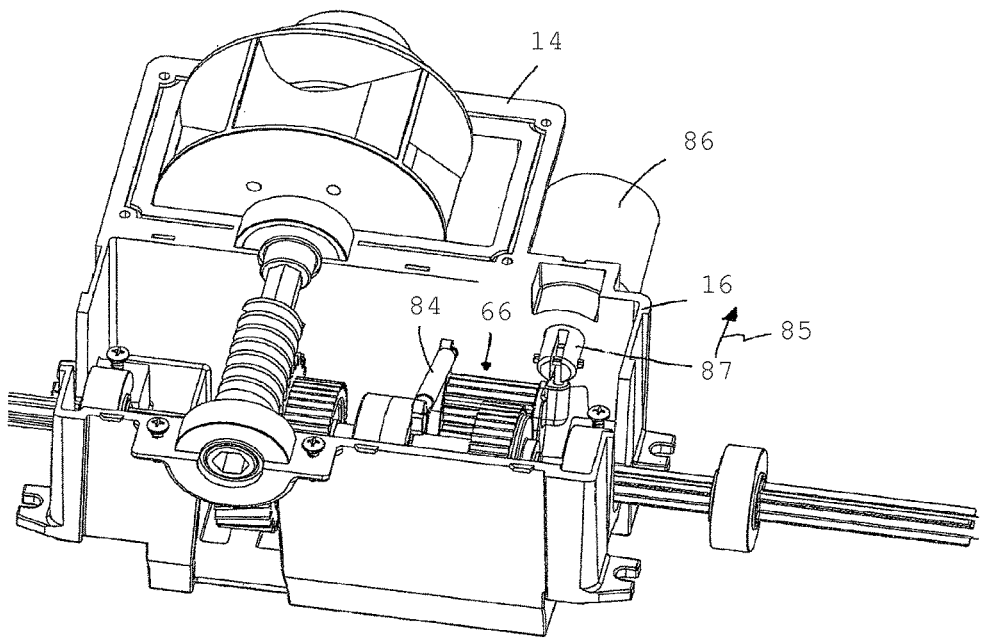

In order to facilitate the pivoting of the reversing mechanism 66 between its first and second operating positions, a linear actuator 86 (such as illustrated in FIGS. 6A and 6B), such as a solenoid, may be provided, e.g., external to the drive unit 16, whose actuator arm 87 projects into the drive unit and is pivotally articulated to the reversing mechanism 66 such that actuation thereof pivots the reversing mechanism between its first and second operating positions. In the "rest" state of the linear actuator 86 (i.e., when no current is applied thereto), as illustrated in FIG. 6A, the actuator arm 87 is fully extended. The spring 84 ensures that the actuator arm 87 is in this position, and thus that the reversing mechanism 66 maintains it's first operating position, when the linear actuator is in its rest state. In the "active" state of the linear actuator 86 (i.e., when a current is applied thereto, causing linear movement of the actuator arm 87 in a direction indicated by arrow 85), as illustrated in FIG. 6B, the reversing mechanism 66 is brought into its second operating position.

It will be appreciated that as the operating position of the reversing mechanism 66 determines whether the robot 10 follows a substantially straight trajectory or executes a turn, the direction of movement of the robot may be controlled by the linear actuator 86.

In addition to the above-mentioned components, it will be appreciated that the drive unit 16 and/or the drive mechanism 44 comprise a number of bushings, bearings, etc., as necessary to ensure efficient operation of the drive mechanism.

Figure 7:
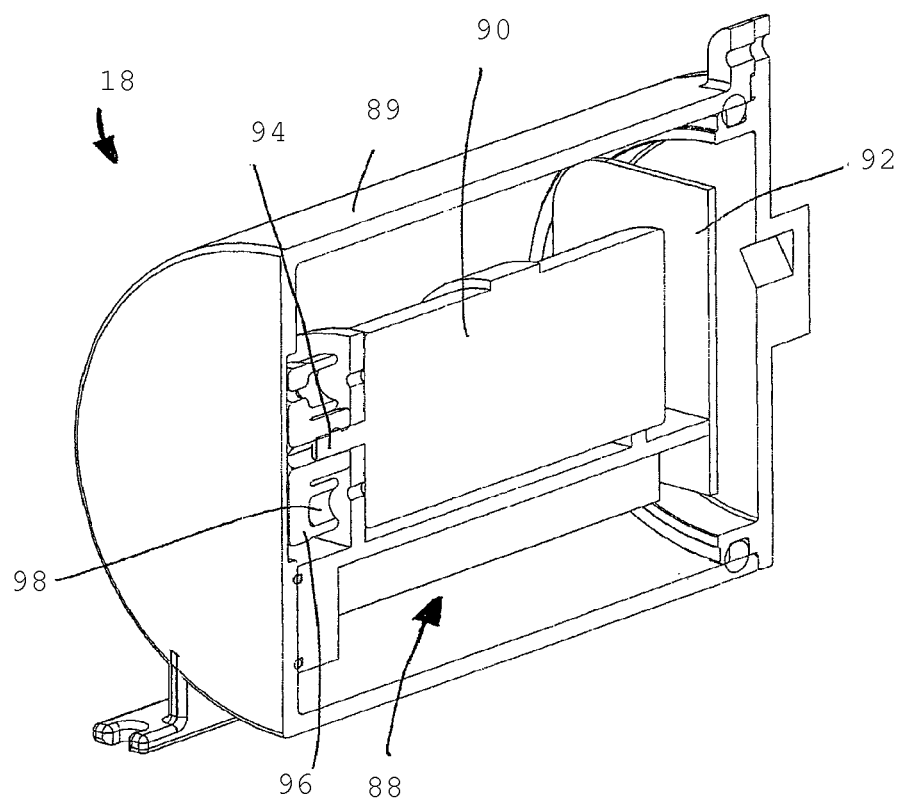
FIG. 7 is a cross-sectional view of a control unit of the robot.
Figure 8:
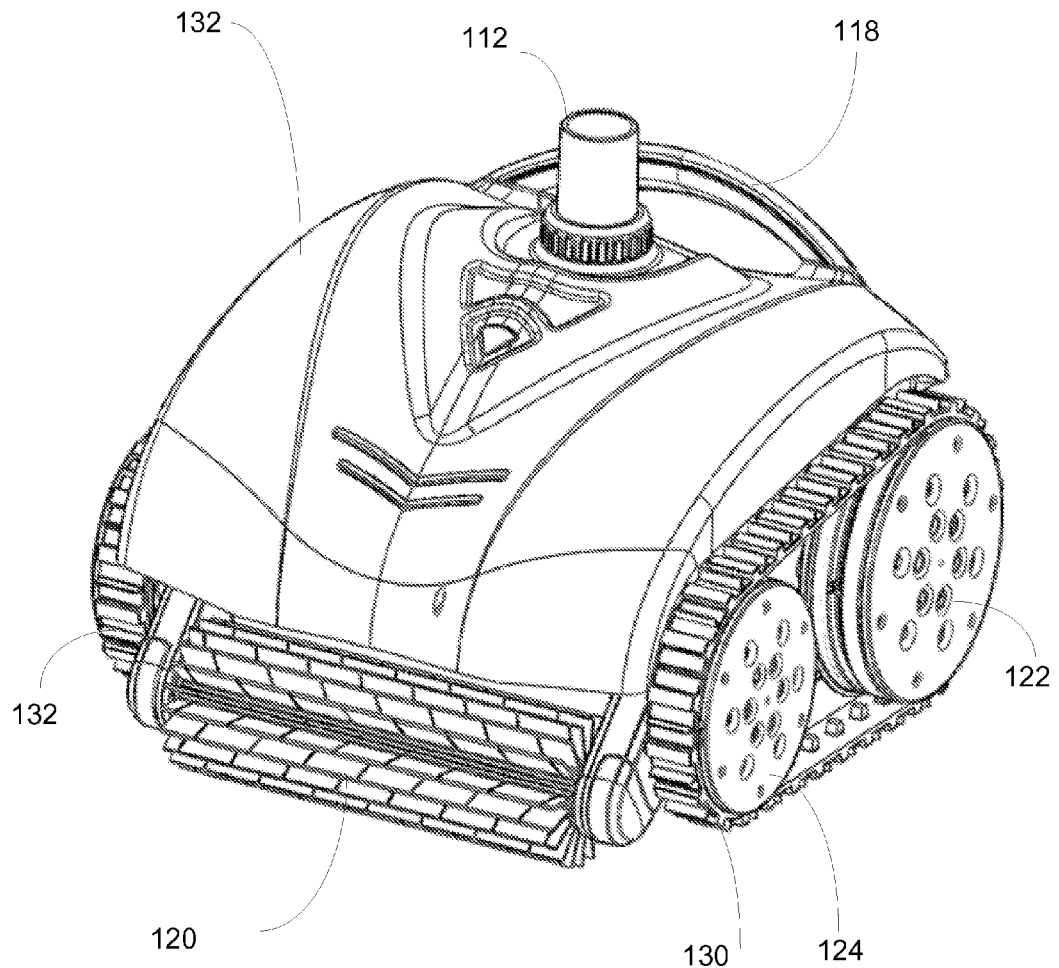
FIGS. 8 and 9 are top perspective views of a robot according to the present invention.
Figure 9:
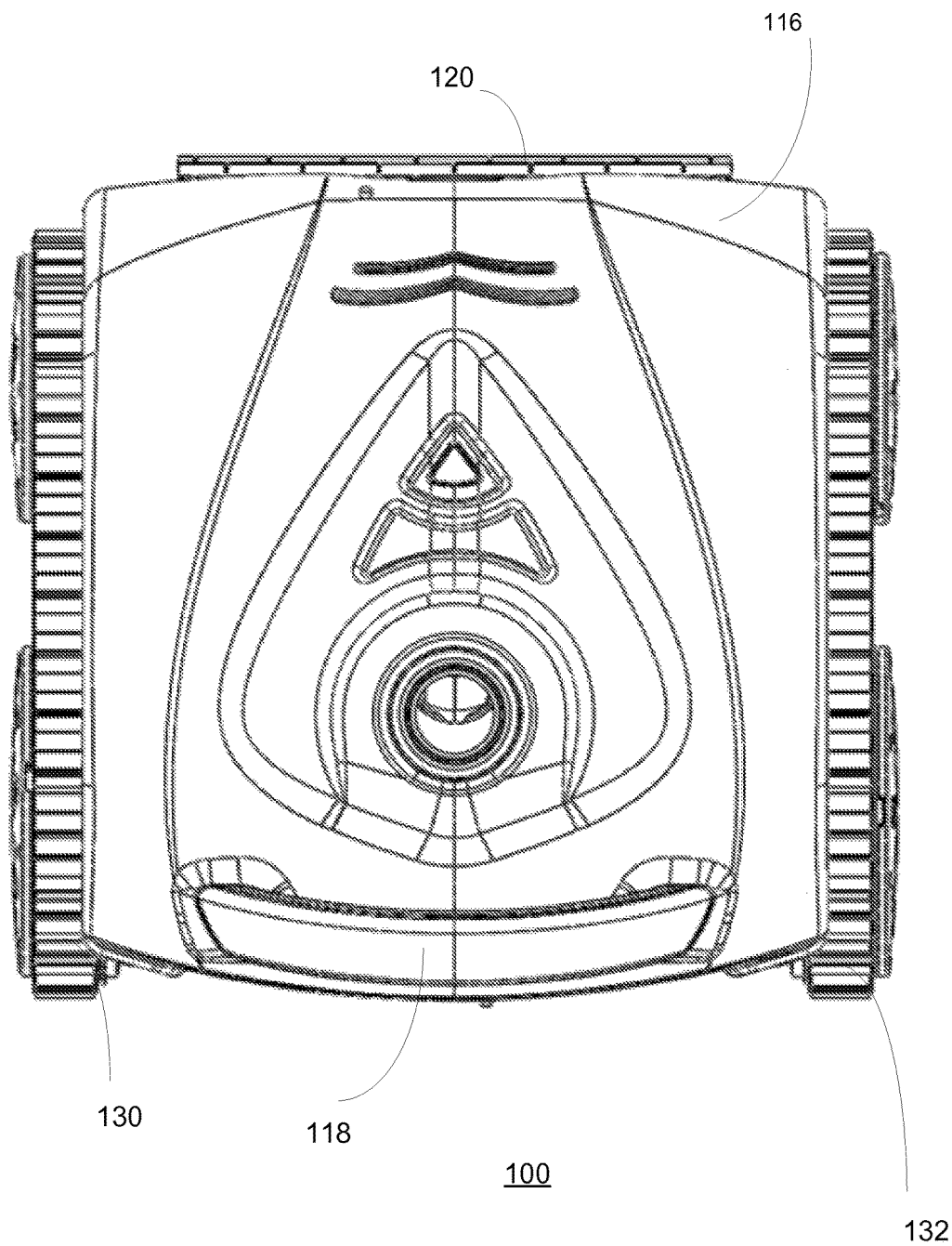
Figure 10:
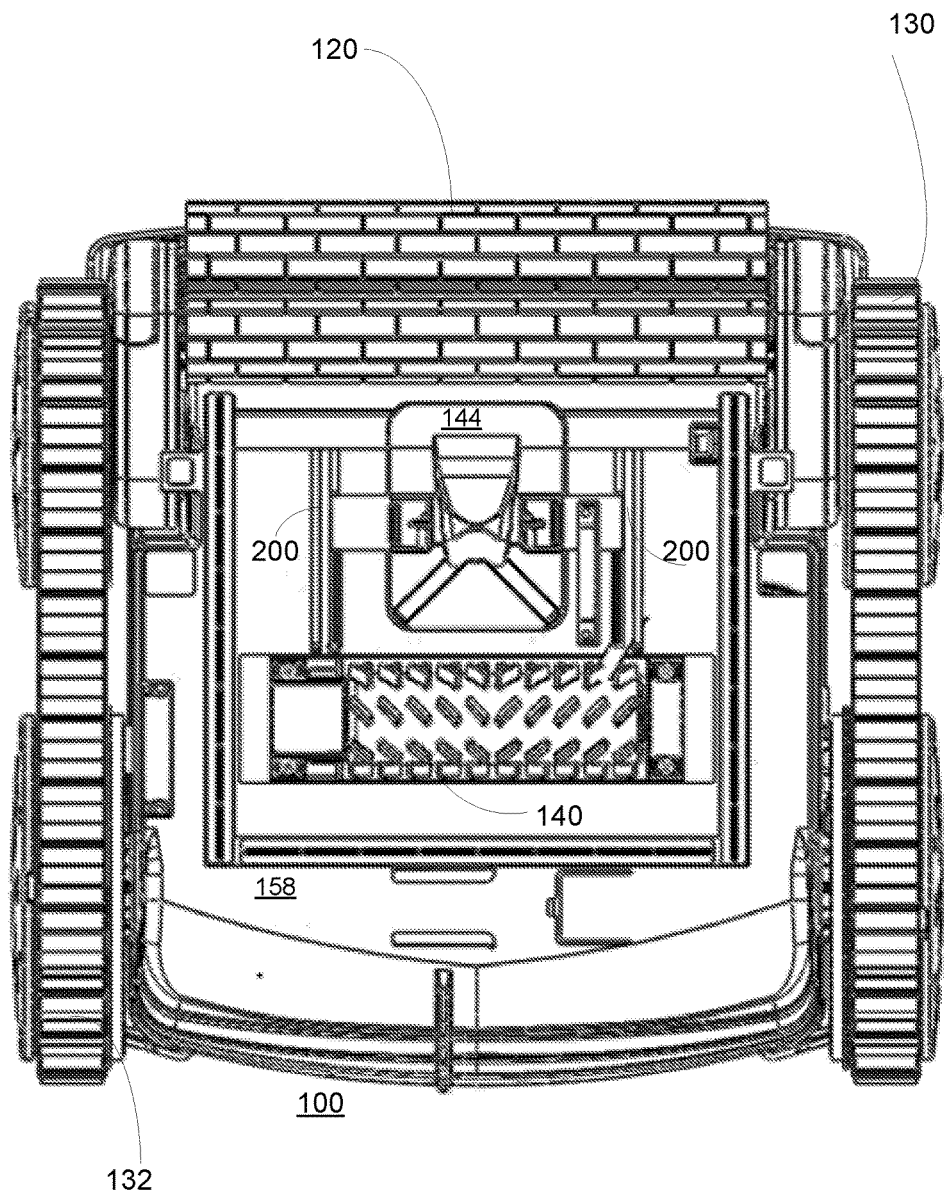
FIG. 10 is a bottom view of a robot according to the present invention.
Figure 11:
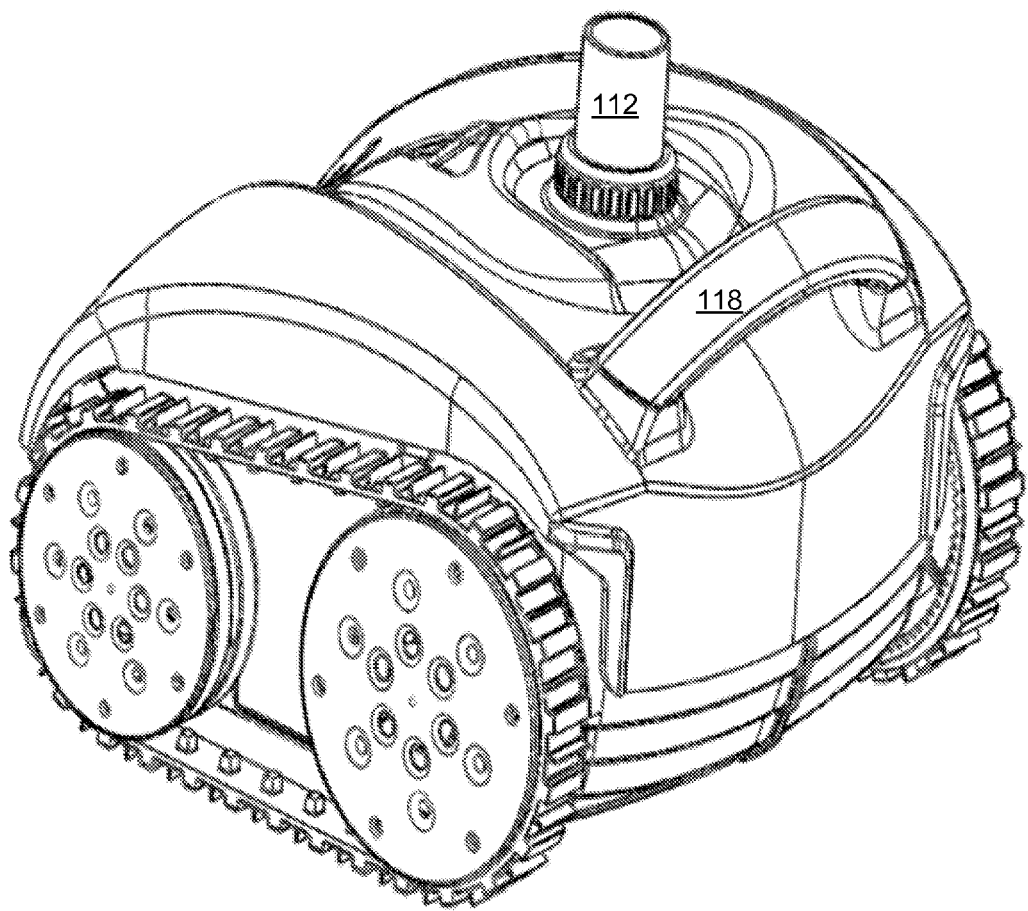
FIG. 11 is a top perspective view of a robot according to the present invention.
Figure 12:
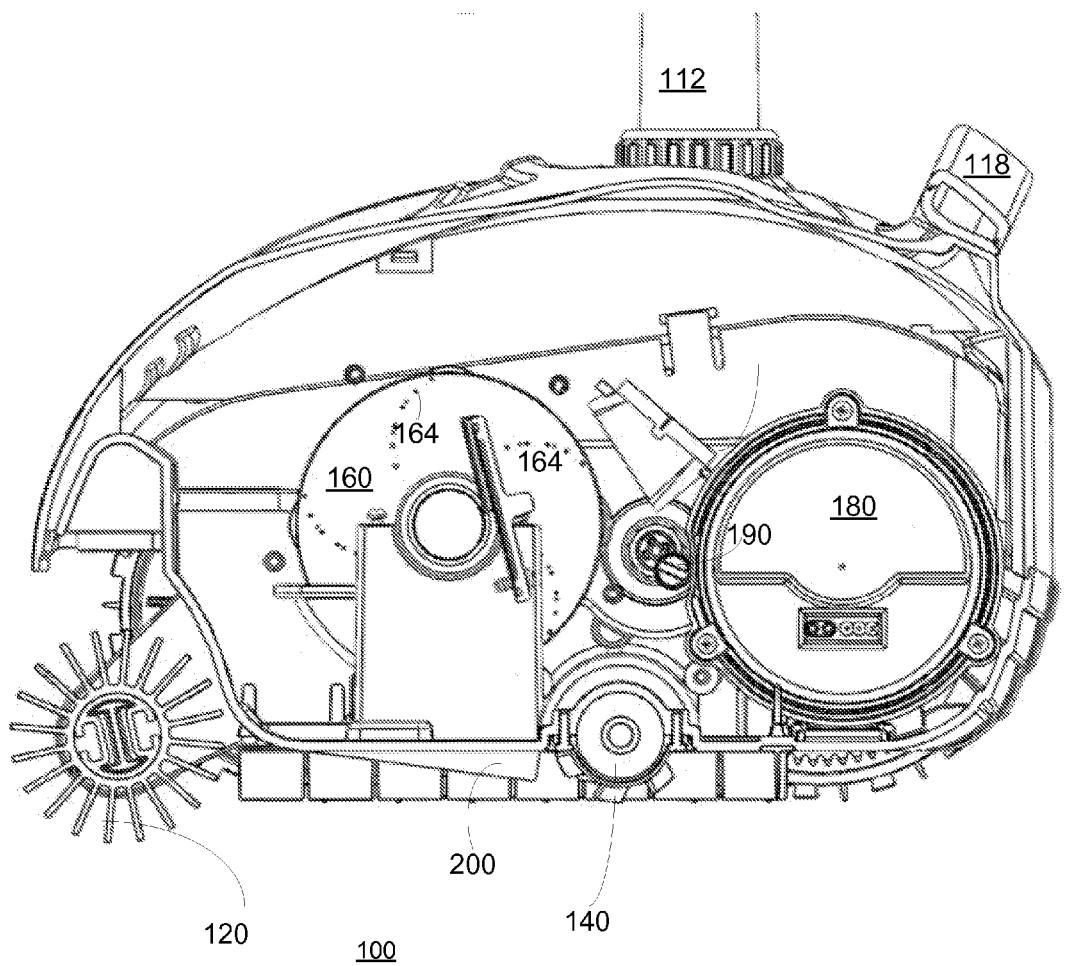
FIGS. 12, 14 and 15 are a cross sectional views of a robot taken along a longitudinal axis that is proximate to a right side of the robot according to the present invention.

As illustrated in FIG. 7, the control unit 18 is a sealed compartment 89, and comprises an electrical control system, which is generally indicated at 88. The control system 88 is self-contained and self-sufficient, i.e., it comprises all components necessary to generate its own power at least during normal use of the robot 10 and to direct operation thereof.

As such, it comprises an electrical generator 90 and an electronic controller 92. The electrical generator 90 provides all the power necessary for the electronic controller 92. In addition, a rechargeable battery or high-capacity capacitor (neither illustrated) may be provided to store an amount of backup power which may be necessary to power the electronic controller 92 during brief intervals when the generator 90 is not providing power.

Since, as noted above, the control unit 18 is housed in a sealed compartment, ingress of water thereto, and subsequent damage thereby to components of the electrical control system 88, is prevented.

The electrical generator 90 can be any known generator, such as a dynamo, and is driven by the rotation of the turbine 36. In order to maintain the control unit 18 as a sealed compartment, the power shaft 42 of the turbine 36 and the shaft 94 of the generator 90 may be magnetically coupled to one another (the juxtaposition of the power shaft of the turbine and the control unit is illustrated, e.g., in FIG. 1D). Thus, the power shaft 42 of the turbine 36 comprises magnets embedded therein, at least on or near the face thereof which substantially abuts the control unit 18. Similarly, the generator is arranged within the control unit such that the generator shaft 94 faces the interior wall of the control unit 18 which faces the turbine 36. A disk 96 with magnets 98 embedded therein may be provided on the generator shaft 94 to be coupled with the power shaft 42 of the turbine 36 and to drive the generator shaft. Thus, as there is no physical contact necessary between the power shaft 42 of the turbine 36 and the generator shaft 94, it is not necessary to utilize any mechanism to couple the turbine and the generator 90 which may compromise the seal of the control unit 18.

The electronic controller 92 may be any known controller which may direct/regulate at least some of the operations of the robot, such as an integrated circuit, etc. It may be adapted to be pre-programmed with any known or novel scanning algorithm. In order to control the direction of movement of the robot 10, it controls the linear actuator 86. Wire leads (not illustrated) between the controller 92 and the actuator 86 carry control signals thereto. Since the leads are not moving parts, they may be passed from the controller 92 within the control unit 18 to the linear actuator 86 via an opening which may be subsequently sealed. Thus, the seal of the control unit 18 is maintained.

In addition, the electronic controller 92 may be adapted to detect a wall, or any similar obstacle, based on feedback from the generator 90. As explained above, due to the direct drive relationship between the constant axle 46 and the mechanical drive shaft 40, any reduction in speed of the robot 10 caused by an external source will result in a reduction in speed of the turbine 36, irrespective of the rate of flow of water through the fluid path. The reduced speed of the turbine 36 results in a reduced speed of the generator 90, which is associated with a lower electrical output than is associated with the generator when the robot 10 moves at its normal speed. Consequently, when a wall is encountered, the reduction of speed of the robot 10 can be detected by the controller 92 by measuring a reduced electrical output of the generator 90. As the robot 10 may temporarily experience a reduction in speed for reasons other than encountering a wall, the controller 92 may be adapted to determine that a wall has been encountered when one or more specific criteria associated with the reduction in power output by the generator, such as a predetermined time over which the output is reduced, the amount of the reduction, etc.

It will be appreciated that the generator 90 and the controller 92 may each be housed in separate sealed compartments, and electrically connected via wire leads, with the points of entry of the leads into each container being sealed.

Each one of FIGS. 8-23 illustrates the exterior of suction-powered pool cleaning robot 100, components of the suction-powered pool cleaning robot 100 or the interior of the suction-powered pool cleaning robot 100 according to various embodiment of the invention.

Figure 13:
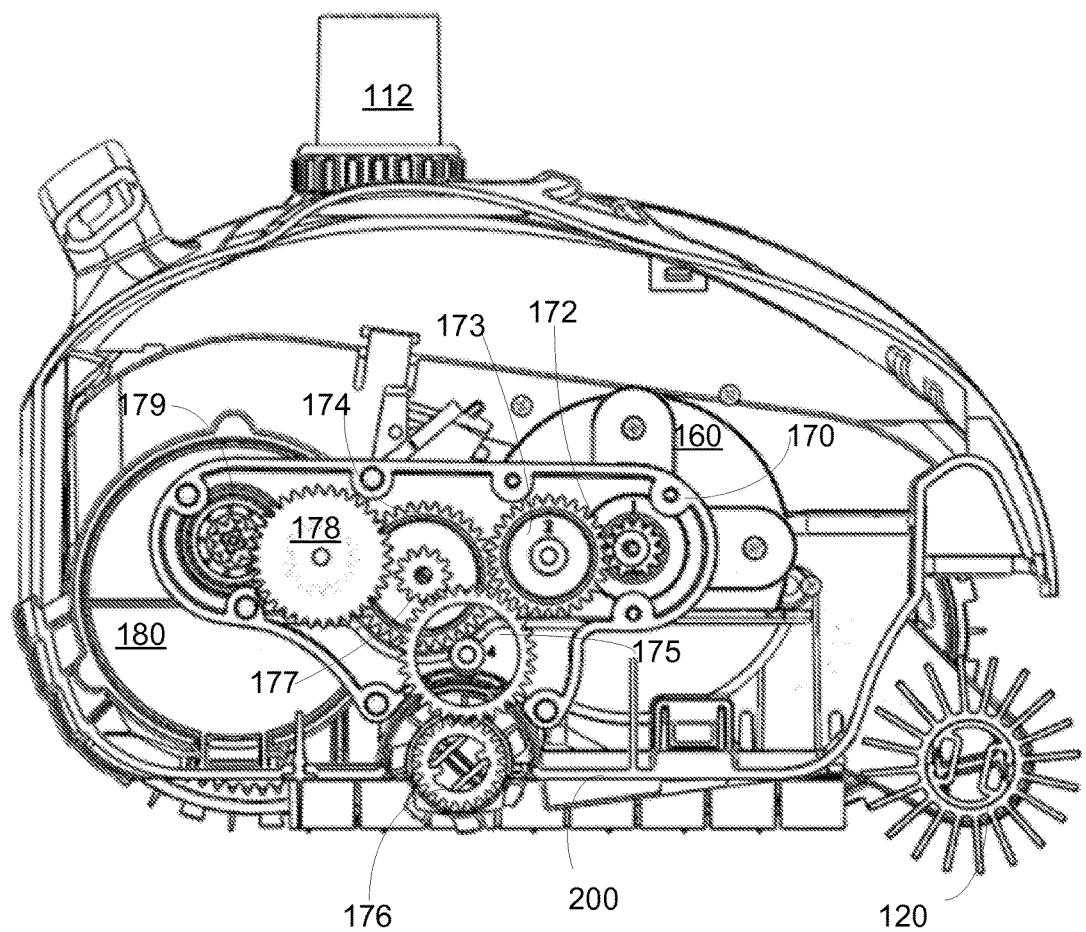
FIGS. 13 and 19 are cross sectional views of a robot taken along a longitudinal axis that is proximate to a left side of the robot according to the present invention.

These figures illustrate the of suction-powered pool cleaning robot 100 as including:
 a. A front brushwheel 120.
 b. Fluid outlet 112.
 c. Housing 116.
 d. Handle 118.
 e. Tracks 130 and 132 (positioned at both sides of the housing 116).
 f. Driving wheels 122 and 124 (coupled to track 130).
 g. Alert indicator 114 that is located at the center of an upper-front area of the housing 116 for providing a visual signal that may be indicative of a status of the suction-powered pool cleaning robot 100.
 h. An intermediate wheel 140 positioned at the bottom of the surface of the housing, between tracks 130, 132, front brush wheel 120 and the rear end of housing 116. The intermediate wheel 140 may be rotated by a movement mechanism of the robot 100 and may assist in preventing the robot 10 to be stuck on obstacles located on the bottom of the pool. The lowest point of the intermediate wheel may 140 be above the lowest point of the front brushing wheel 120 and while the robot 10 propagates along the bottom of the pool (assumed to be horizontal) it is not expected to contact the bottom of the pool. When the robot 10 propagates above an obstacle the intermediate wheel 140 can contact that obstacle and its rotation may assist in dislodging from the obstacle.

i. Inclined fins 200 that may have a trapezoid or triangular shape—that extend from the bottom surface 150 of the housing 116. One inclined fin 200 is positioned between the fluid inlet 144 and track 132 while another inclined fin 200 is positioned between the fluid inlet 144 and track 130. The inclined fins 200 are illustrated having a longitudinal axis that is substantially parallel to a longitudinal axis of the robot 100. FIG. 13 illustrates the height of a front edge of each inclined fin 200 as being lower than the height of the read edge of the inclined fin 200. The lowest point of each of the inclined fins 200 is higher than the lower portion of tracks 130 and 132 but higher than the lowest point of the intermediate wheel 140. When the robot 100 starts climbing an obstacle (for example—foreign object positioned within the pool) the inclined fins 200 may contact that obstacle and due to their inclination change the orientation of the robot 100. This may cause the robot 100 to pass the obstacle. For example, the inclined fins 200 can cause the robot to fall or instantly change its orientation—when the object passes the inclined fins (for example—when the lowest contact point (such as the rear edge) of the inclined fins 200 just pass the obstacle). According to an embodiment of the invention the inclined fins 200 are positioned and shaped to direct an obstacle towards the intermediate wheel 140. The inclined fins 200 are inclined towards the intermediate wheel 140 so that once higher part contacts an obstacle the progression of the robot causes the obstacle to slide along the oriented fins until contacting the intermediate wheel 140 that rotates against the obstacle in order to release the robot from the obstacle.

The suction-powered pool cleaning robot 100 can include multiple components illustrated in any of the previous and/or following figures.

Learning Capabilities

According to various embodiments of the invention the suction-powered pool cleaning robot may be arranged to control its operation based upon information obtained by one or more sensors. The suction-powered pool cleaning robot may be arranged to detect that it is stuck, that it attempts to climb a wall of the pool, that it propagates between walls of the pool, or that it needs to adjust its propagation patterns when propagating on different types of textures of the pool surfaces. For example: when pool surface is too slippery and the cleaner does not detect any obstacles for a period of time it will then adjust the threshold in a way that eventually will enable it to detect an obstacle.

and may also detect other information relating to the status of the suction-powered pool cleaning robot and in response it may attempt to change a parameter of operation of the robot (for example—change its direction of propagation, generate an alert, change a color of light it emits, changes a frequency of light pulses, and the like).

And it may also respond to varying fluid flow rates and adjust itself again according to the new parameter and subsequently implement a new propagation pattern. For example, during a cleaning cycle, the main external Pool filter may become clogged and therefore flow rate will be reduced. The cleaner will adjust itself accordingly.

According to an embodiment of the invention the suction-powered pool cleaning robot may include:
  a. A fluid outlet (denoted 112 in FIGS. 8, 9, 11, 12, 17, and 19) adapted for connection to a suction hose.
  b. A fluid inlet (denoted 144 in FIG. 10), with a fluid path between the fluid inlet and the fluid outlet.
  c. A turbine (denoted 160 in FIGS. 12, 13 and 19) at least partially disposed within the fluid path so as to extract energy from flow of fluid through the fluid path.
  d. An electrical generator (denoted 180 in FIGS. 12, 13, 16A, 16B and 19) for providing power thereto and adapted to be driven by the turbine.
  e. A sensor (such as turbine rotation sensor 510 of FIG. 23) arranged to generate rotation information indicative of a speed of rotation of the turbine. The sensor (also referred to as turbine rotation sensor) can track the rotations of the turbine in any manner for example—directly (by monitoring the turbine rotation) or indirectly (for example—by monitoring the voltage level supplied by the electrical generator).
  f. An electronic controller (denoted 500 in FIG. 23) that may be arranged to control an operation of the suction-powered pool cleaning robot in response to at least the rotation information.

According to various embodiments the electronic controller 500 may be arranged to:
  a. Trigger a rotation of the suction-powered pool cleaning robot if the rotation information indicates that the suction-powered pool cleaning robot attempts to either climb a wall of the pool or contacts an obstacle, sucks large debris.
  b. Trigger a rotation of the suction-powered pool cleaning robot due to registering of a completion of a pre-established pool crossing period.
  c. Trigger a rotation of the suction-powered pool cleaning robot due to an increase of an inclination of the suction-powered pool cleaning robot above a predetermined inclination threshold (expected to represent pool surface inclination.
  d. Trigger a rotation of the suction-powered pool cleaning robot by triggering a movement of a flexible axle (denoted 250 in FIGS. 17, 19 and 22) that selects which gear out of a pair of gears will drive a driving wheel of the robot, wherein the pair of gears rotate at opposite directions. The triggering may include moving a piston that causes the flexible axle to move. The reciprocating movement of the piston can be translated to a movement of the flexible axle—for example by converting linear movement to a rotational movement.
  e. Determine that the rotation information indicates that the suction-powered robot attempts to climb the wall if a value of the rotation information maintains substantially constant during a period that is longer than a maximal expected time required for the robot to cross the pool. The maximal expected time may be updated based upon the propagation speed of the robot as reflected by the rotation information.
  f. Calculate the maximal expected time required for the robot to cross the pool.
  g. Determine that the rotation information indicates that the suction-powered robot attempts to climb the wall if the rotation information indicates that the rotational speed of the turbine is below an expected inter-wall propagation rotational value for at least a certain period.
  h. Update the expected inter-wall propagation rotational value (that may represent an expected speed of the robot while the robot cleans the pool while propagating on the bottom of the pool) in response to values of the rotation information obtained during one or more time windows.

i. Update the expected inter-wall propagation rotational value in response to samples of the rotation information that represents changes in the rotational speed of the turbine.
j. Trigger a rotation of the robot if the rotation information indicates that the suction-powered pool cleaning robot is stuck.
k. Trigger an alert indicating that the suction-powered pool cleaning robot is stuck.
l. Trigger an alert indicating that the suction-powered pool cleaning robot is attempts to climb a wall.
m. Control the operation of the suction-powered pool cleaning robot in response to at least the rotation information and inclination information provided by an inclination sensor (denoted 530 in FIG. 23) that may be arranged to sense an inclination of the suction-powered pool cleaning robot. The inclination sensor (denoted 530 in FIG. 23) may include a marble, may include a MEMS component, a Gyro and the like.
n. Update an expected inter-wall propagation rotational value in response to suction information provided by suction sensor (denoted 520 in FIG. 23).
o. Update the expected inter-wall propagation rotational value in response an expected decline of the suction resulting from clogging of a filter of a device that applies the suction. It is expected that the external device that sucks fluid and is coupled to the fluid outlet aggregates dirt and gradually gets clogged and thus the suction declines over time until the filter is cleaned. The electrical controller can determine, based upon suction information and/or the rotation information, that the suction weakens and may update the inter-wall propagation rotational value.
p. Update the expected robot rotation period in response an expected decline of the suction resulting from clogging of a filter of a device that applies the suction.
q. Compare the suction information and the rotation information and evaluate a status of the suction-powered pool cleaning robot based upon a result of the comparison. For example—if the suction information represents an expected rotation speed of the turbine and the rotation information also represents substantially the same rotation speed—it may be expected that the robot is propagating along the bottom of the pool and is not stuck. If, for example the suction information represents an expected rotation speed of the turbine that is much higher than the speed reflected by the rotation information—it is expected that the robot attempts to climb a wall, is stuck or there is a certain problem (for example—a foreign element such as a branch that entered the robot and slows the turbine).
r. Estimate a propagation speed of the suction-powered pool cleaning robot and in response attempt to detect obstacle free movement of the suction-powered pool cleaning robot between walls, attempts to climb a wall by the suction-powered pool cleaning robot, and the like.

According to an embodiment of the invention the electronic controller 500 may be arranged to:
a. Receive sensor signals indicative of propagation parameters of the suction-powered pool cleaning robot;
b. Learn propagation patterns of the suction-powered pool cleaning robot and control an operation of the suction-powered pool cleaning robot in response to the sensor signals and the propagation patterns.
c. Calculate and update the propagation patterns in response to values of the sensor signals.
d. Control the operation of the suction-powered pool cleaning robot within a large range of turbine rotational speeds.
e. Provide propagation pattern data to a transceiver of the suction-powered pool cleaning robot for a transmittal of the propagation pattern data by the transceiver.

Figure 24:
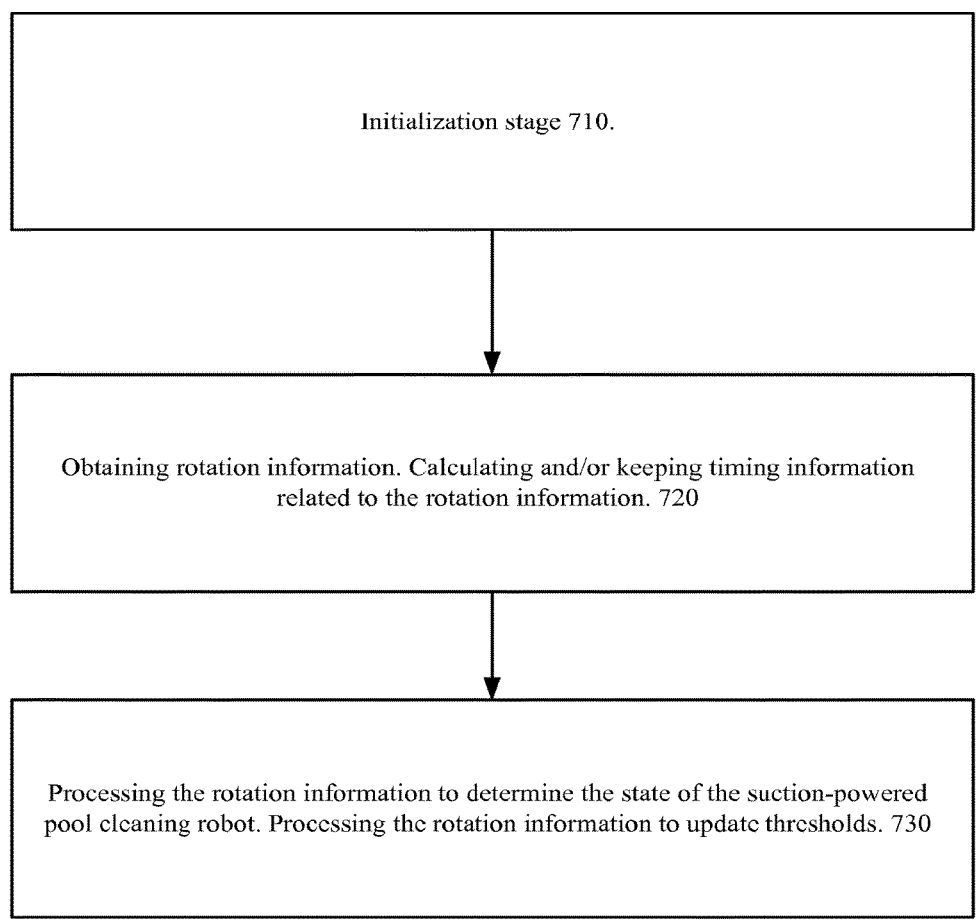
FIG. 24 illustrates a flow chart according to an embodiment of the invention.

FIG. 24 illustrates a method 700 according to an embodiment of the invention.

Method 700 may start by initialization stage 710. During this stage the electrical controller is activated (the turbine starts to rotate).

Stage 710 is followed by stage 720 of obtaining rotation information. This stage may also include calculating and/or keeping timing information related to the rotation information. The timing information can include timestamps associated with the collection of rotation information, time gaps between the acquisition of different samples of the rotation information, and the like.

Stage 720 may be followed by stage 730 of processing the rotation information to determine the state of the suction-powered pool cleaning robot. Additionally, stage 730 may include processing the rotation information to update thresholds.

Stage 730 may include the following:
a. Monitoring maximal values of the rotation information and tracking a decline in the maximal values over relatively long periods of time (days, weeks, months, years) that may be contributed to the reduction of suction.
b. Detecting maximal values of the rotation information and calculating an inter-wall propagation rotational movement threshold that should represent the propagation of the suction-powered pool cleaning robot between walls of the pool.
c. Detecting an attempt of the suction-powered pool cleaning robot by a reduction in the rotational speed of the turbine (as indicated from the rotation information).
d. Determining a baseline threshold at the beginning of operation of the suction-powered pool cleaning robot.
e. Setting an inter-wall propagation rotational movement threshold to equal the baseline threshold.
f. Updating the inter-wall propagation rotational movement threshold in response to multiple samples of the rotation information. The samples can be weighted, filtered, averaged, and the like. A minimal predetermined number of samples may be acquired before updating the inter-wall propagation rotational movement threshold.
g. Determining whether the baseline threshold represents an inter-wall movement or a wall climbing attempt. If, for example, the suction-powered pool cleaning robot established its baseline threshold while attempting to climb a wall it is expected that after the suction-powered pool cleaning robot starts to propagate between the walls of the pool the rotation information will results in rotation information values that represent higher and even much higher speed—and this may indicate that the baseline threshold value should be updated to reflect the inter-wall propagation of the suction-powered pool cleaning robot.
h. Setting a wall climbing rotational movement threshold to equal the baseline threshold.
i. Setting maximal time required for the suction-powered pool cleaning robot to cross the pool.
j. Detecting that the robot is stuck
k. Counting the number of below-threshold events during which the rotation information samples are of value that is below (by at least a predetermined amount) the inter-wall propagation rotational movement threshold.

l. Counting the number of above-threshold events during which the rotation information samples are of value that is above (by at least a certain amount) the inter-wall propagation rotational movement threshold.

m. Updating the inter-wall propagation rotational movement threshold based upon the above-threshold events and, additionally or alternatively, the below-threshold events.

According to an embodiment of the invention the suction-driven pool cleaning robot may be capable of data extraction and loading software on the robot.

Figure 25:
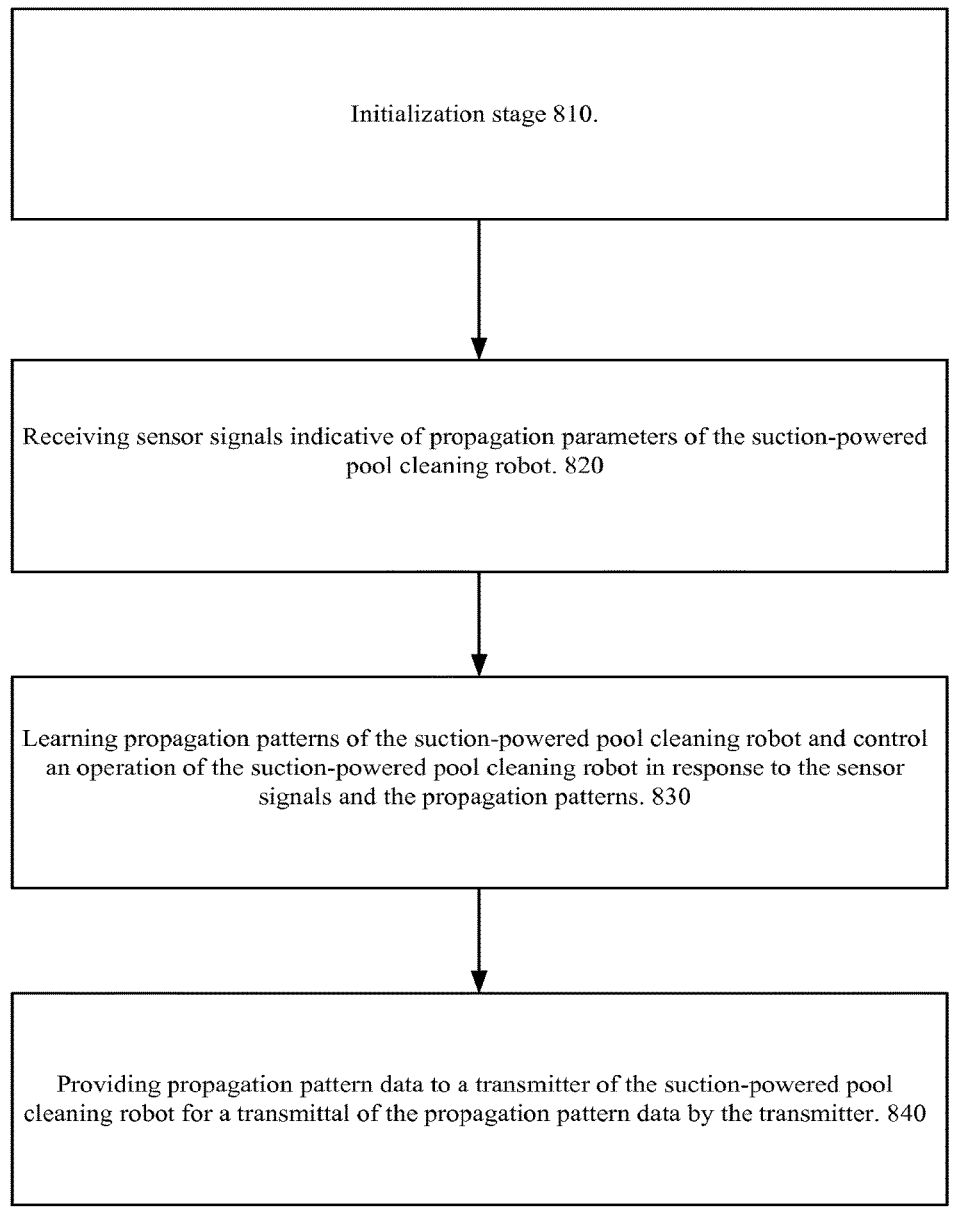
FIG. 25 is a flow chart of a method according to an embodiment of the invention.

FIG. 25 illustrates method 800 according to an embodiment of the invention.

Method 800 may start by initialization stage 810. During this stage the electrical controller is activated (the turbine starts to rotate).

Stage 810 is followed by stage 820 of receiving sensor signals indicative of propagation parameters of the suction-powered pool cleaning robot.

Stage 820 is followed by stage 830.

Stage 820 may include learning propagation patterns of the suction-powered pool cleaning robot and control an operation of the suction-powered pool cleaning robot in response to the sensor signals and the propagation patterns. Stage 830 may include calculating and updating the propagation patterns in response to values of the sensor signals.

Stage 840 may be followed by stage 830 of providing propagation pattern data to a transceiver of the suction-powered pool cleaning robot for a transmittal of the propagation pattern data by the transceiver.

Figure 23:
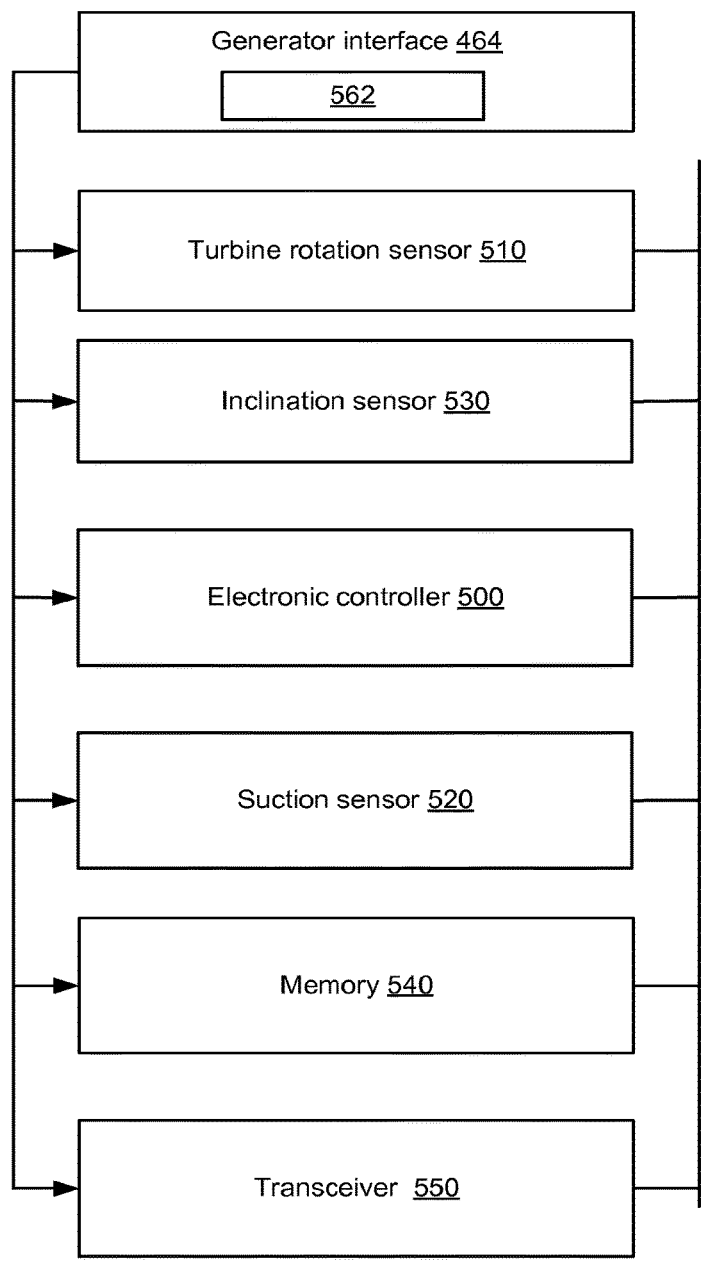
FIG. 23 illustrates various electrical components according to an embodiment of the invention.

FIG. 23 illustrates the electrical controller 500 as being coupled to a memory 540 and to a transceiver such as radio frequency identification (RFID) transceiver.

The electrical controller 500 can monitor information from various sensors and may store the information at memory 540. The information may include inclination information, rotation information, suction information, timing information and propagation pattern data. The information can represent an outcome of a computational process (such as averaging or any other function) applied on the information—for example, hours of work, hours of work at certain fluid flow levels, number of session, number of wall climbing attempts. The stored information (in memory 540) may also include information about the robot—serial number, date of production, configuration information and the like.

The transceiver 550 may communicate with external elements to exchange the information gained, to be programmed and the like.

The transceiver may also be used for loading software. The software can be stored at a certain location and may be accessed by the electronic controller once the latter is turned on.

Brushless AC three-phase Generator

Electrical generator (denoted 182 in FIGS. 20 and 21) can be a brushless alternating current (AC) three phase generator. It may be a brushless generator that is without a Hall Effect circuit.

Figure 20:
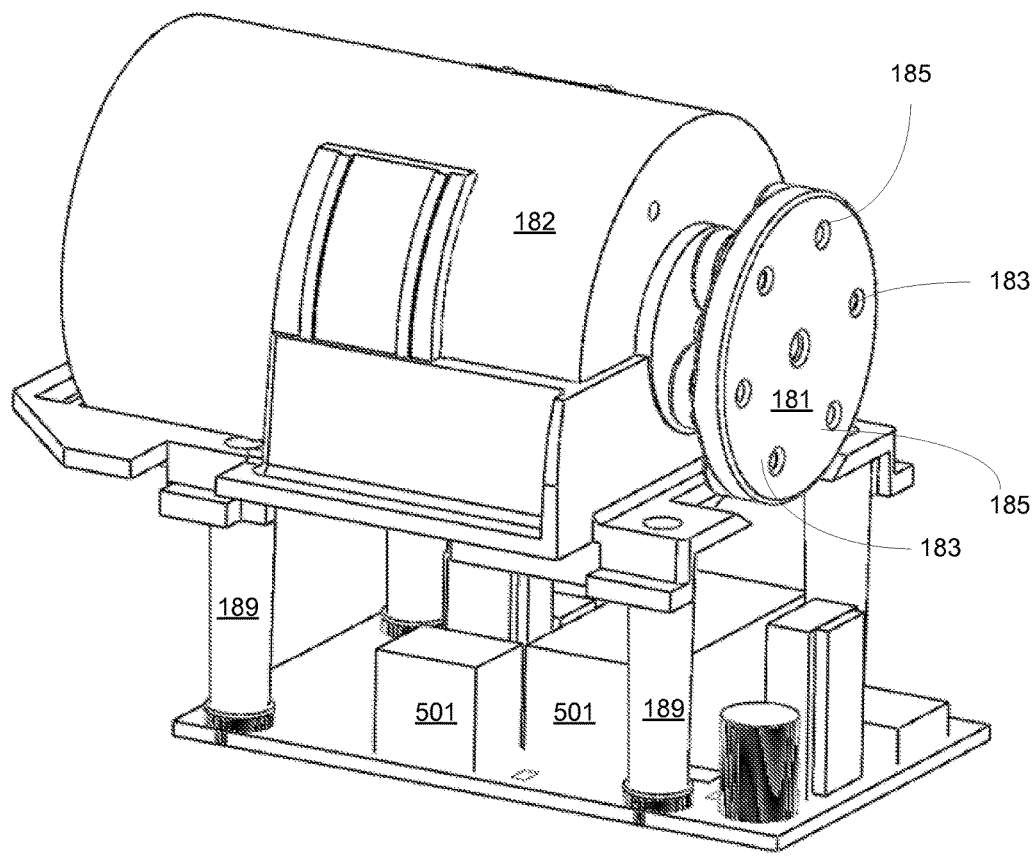
FIG. 20 is a perspective view of an electrical generator, PCB and electrical components according to the present invention.
Figure 21:
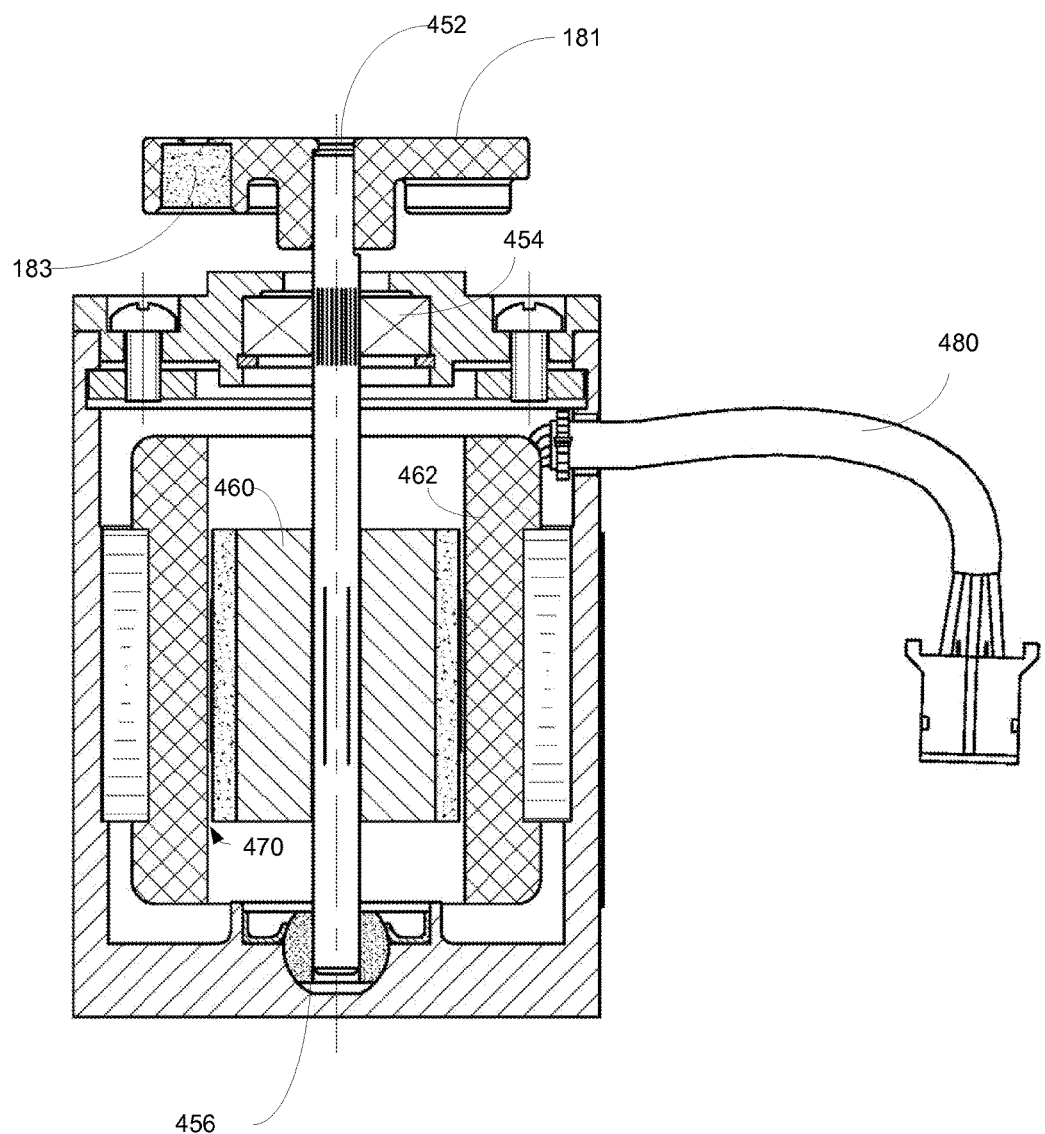
FIG. 21 is a cross sectional view of the electrical generator taken along a longitudinal axis of the electrical generator according to the present invention.
Figure 22:
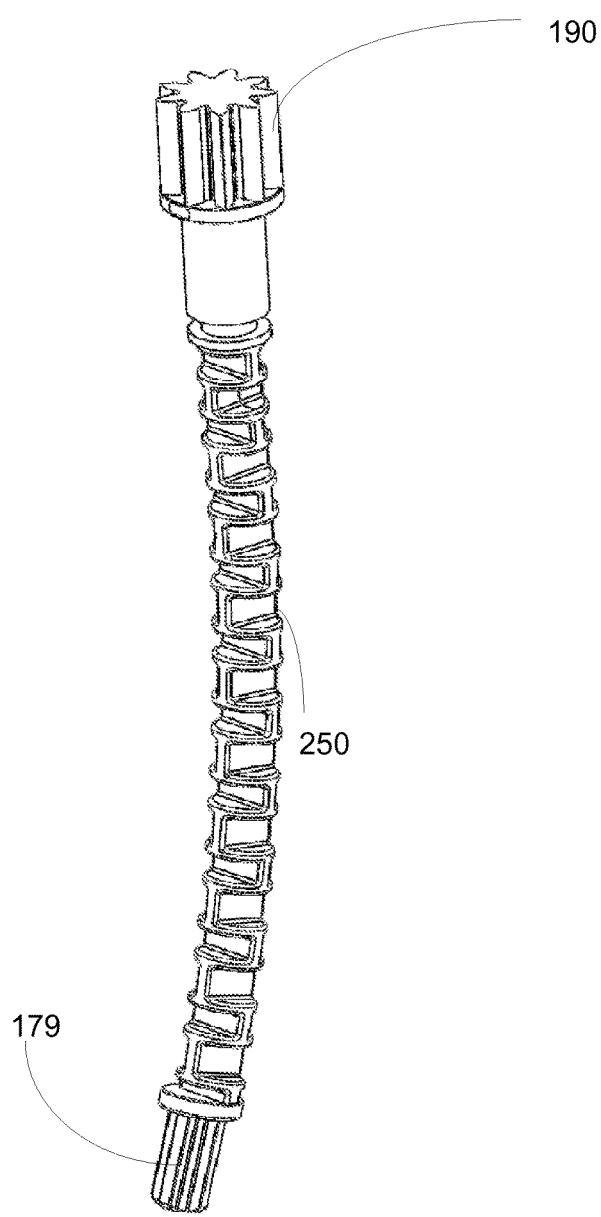
FIG. 22 is a perspective view of a flexible axle and gears connected to the flexible axle according to the present invention.

Referring to FIGS. 20 and 21—electrical generator 182 may include rotor that includes a main axle 452 that may contact (may be supported by) one or more brushless bearings—such as ball or slide bearings 454 and 456.

The rotor may be rotated in a contactless manner—for example by electromagnetic coupling.

FIGS. 20 and 21 illustrate the main axle 452 of the rotor as being connected to a multiple-magnet element that may include a disc 181 that is connected to (or includes) multiple magnets such as two alternating sets of magnets—north pole magnets 183 and south pole magnets 185. The multiple-magnet element is magnetically coupled to a driving gear.

Referring to FIG. 21—the distance between magnets 460 of the rotor of the electrical generator and coils 462 of a stator of the electrical generator is very small—for example the distance can be smaller than a few millimeters The generator may be a three-phase brushless alternating current generator and is wired to a voltage rectifier and may be in a star configuration.

The electrical generator has a very low mechanical resistance (obtained by the brushless configuration, supporting the main axle 452 by brushless bearings 454 and 456 and the small air gaps (between magnets 460 and coils 462) the electrical generator can smoothly start working and operate in a continuous manner. Due to the low torque drag of the electrical generator and using a generator interface 464 that includes a star configured diode bridge 562, high power conversion efficiency is obtained and adequate electrical power (for example—0.4 watts) is generated even at low rotational speed of the turbine.

The electrical generator has a stator that includes six coils 462—two coils for each of the three phases—wherein the coils are interlaced.

Ignition and operation of the electrical generator is slow and gentle. For example—when the suction starts and the flow of fluid within the fluid path increases from 0 cubic meters to 8.5 cubic meters the turbine may increase its rotational speed from 0 rpm to 2000 rpm and the electrical generator may produce sufficient voltage and current to activate the electrical controller and other electrical components.

FIG. 20 illustrates the generator as being located over a printed circuit board 184 which is supported by poles 189 that is coupled to various electrical components (denoted 501 in FIG. 20), some of these electrical components may be illustrated in FIG. 23.

The electrical components 501, PCB 184 and the generator 182 are enclosed within housing 180 that keeps these elements dry.

Cross Flow Turbine

Figure 19:
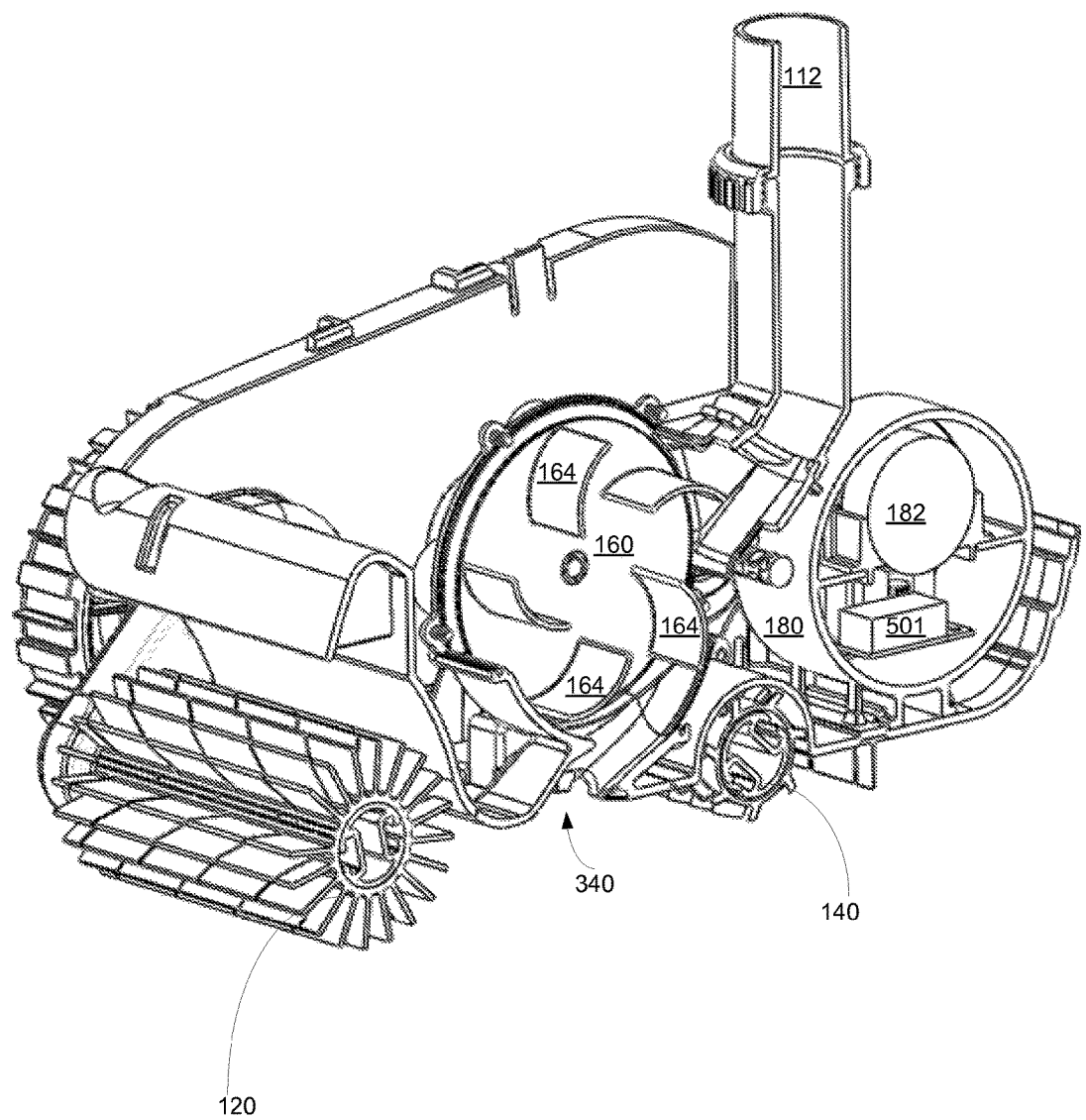

FIG. 19 illustrates the turbine 160 as being a cross flow turbine. It has multiple blades such as five curved blades (denoted 164 in FIG. 19) having their inner edge at a certain distance from the center of the turbine).

The blades are spaced apart from each other to allow any element that passes through fluid inlet to pass through the cross flow turbine. Especially—openings defined between any pair of blades are not smaller than the fluid inlet.

The cross flow turbine provides the ability to work with relatively low suction levels, provide relatively large torque and allows the passage of waste and various objects directly through the cross flow turbine without slowing the cross flow turbine.

Gears and Motion Translation Modules

The suction-powered pool cleaning robot 100 may include a driving mechanism that translates a constant rotation of first gear 172 to rotational movements of various driving wheels, to the rotation of the rotor of the electrical generator and to a rotation of intermediate wheel 140.

FIG. 13 illustrates a gear module (driving mechanism) 170 that includes housing 171 and eight gears 172-179.

First gear 172 is driven along a first rotational direction by turbine 160 (it may be connected to the axis of rotation of the turbine 170. First gear 172 meshes with second gear 173. Second gear 173 meshes with third and fourth gears 174 and 175. Fourth gear 175 meshes with fifth gear 176, wherein fifth gear 176 rotates the intermediate wheel 140. The third gear 174 is coaxial with (and is larger than) sixth gear 177. Sixth gear 177 meshes with seventh gear 178. Seventh gear 178 meshes with the eighth gear 179. The eight gear 179 forms one end of the flexible axel 250. Another end of the flexible axel 250 is dented 190 and is moved between positions that differ from each other by the gear (gear 190 or idler gear 222) rotates a driving wheel of the robot 100.

Change of Direction of the Robot

Figure 15:
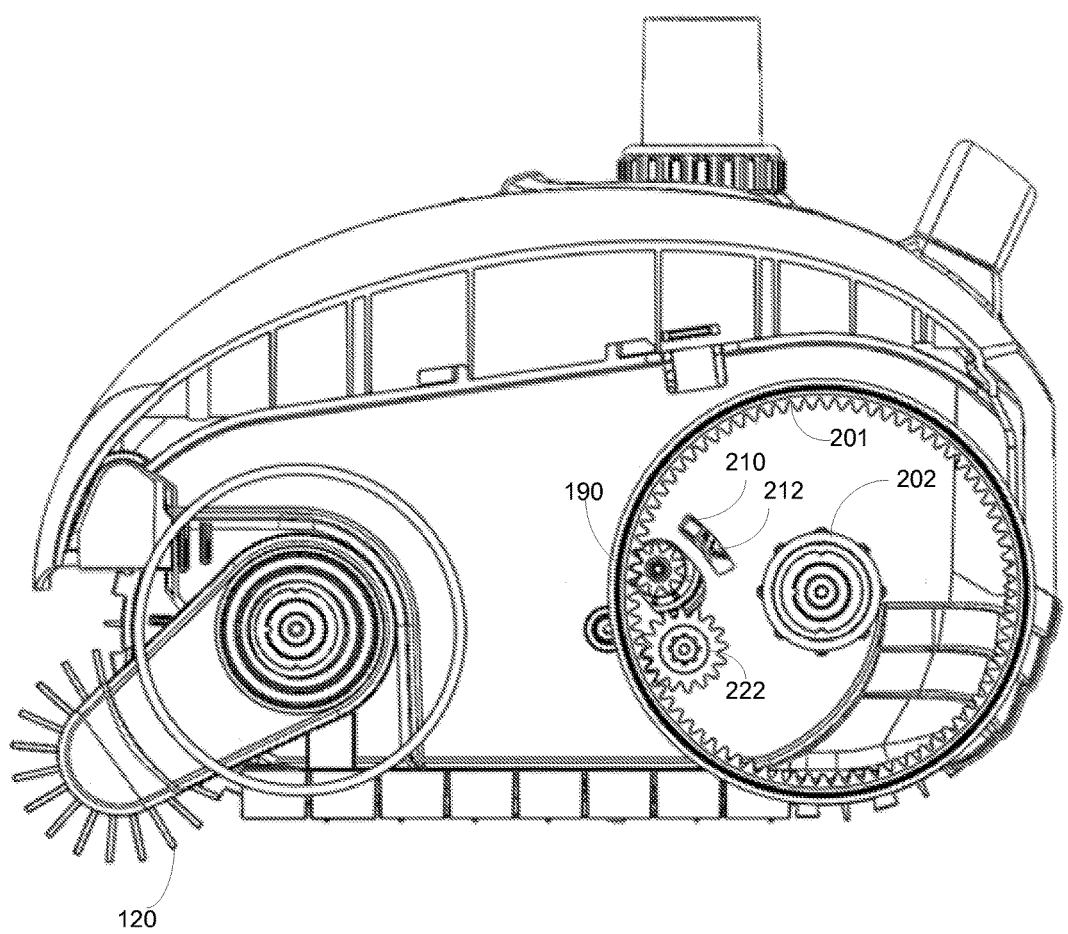

FIG. 15 illustrates gear 190 that is connected to the flexible axle 250 at an upper position (as indicated by knob 210 being positioned at an upper position within window 212). The gear 190 contacts teeth 201 of driving wheel 201 and cause the driving wheel 201 to rotate at a rotational direction of gear 190. Idler gear 222 is rotated by teeth 201 of driving wheel 201.

Figure 14:
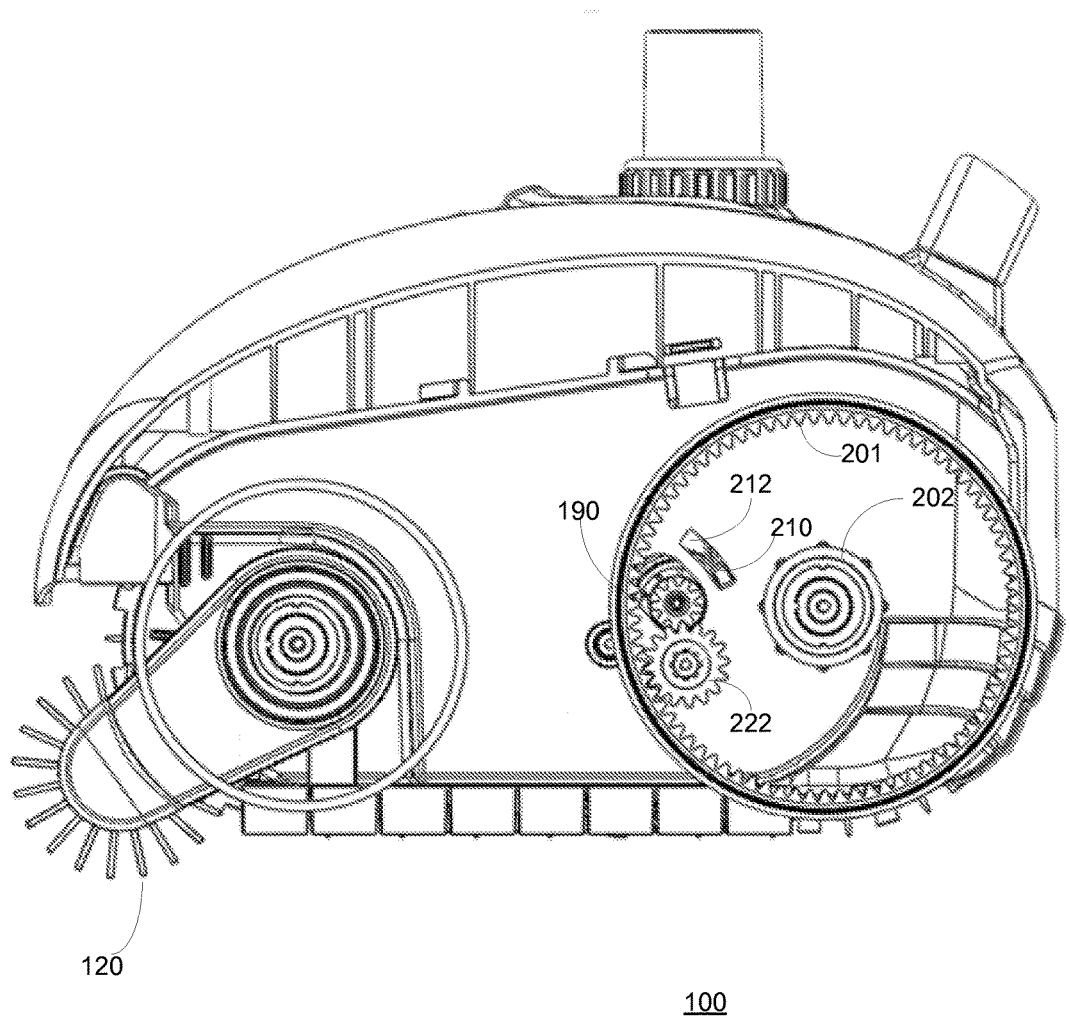

FIG. 14 illustrates gear 190 when the flexible axel 250 is at a lower position (as indicated by knob 210 being positioned at a lower position within window 212). The gear 190 does not contact teeth 201 of driving wheel 201—it (gear 190) contacts the teeth of idler gear 222 that contacts teeth 201 while causing the driving wheel 201 to rotate at an opposite direction to the rotational direction of gear 190.

The movement of the flexible axel 250 from the upper position to the lower position may involve, for example, a linear movement of a piston (such as piston 304 of FIG. 18), a conversion of the linear movement to a rotational movement (by a linear to rotational movement converter—that is illustrated as including tip 210 in FIGS. 14 and 15). The piston (304) may contact gear 190 that is connected to the flexible axle 250 or may contact the flexible axel 250 itself (for example via aperture 302) while allowing the continuous rotation of the flexible axel 250 while being moved between the lower and upper positions.

According to an embodiment of the invention the piston is linearly moved by using a piston controller (denoted 445) that includes a hydraulic circuit and a spring 422. The spring 422 attempts to force the piston 304 to move forwards— away from the spring 422. The hydraulic circuit may force the piston 304 to move backwards—and to compress the spring 402.

The hydraulic circuit includes:
a. An inlet 413 for receiving suction from tube 412 that is connected to the fluid outlet conduit 112.
b. A solenoid 420 that may allow or prevent the suction (from inlet 413) to reach inner chamber 417.
c. Diaphragm 414 that is connected to the piston 304 so that when the suction is provided it moves backwards towards a backward position and thus causing piston 304 to move backwards.

Figure 16A:
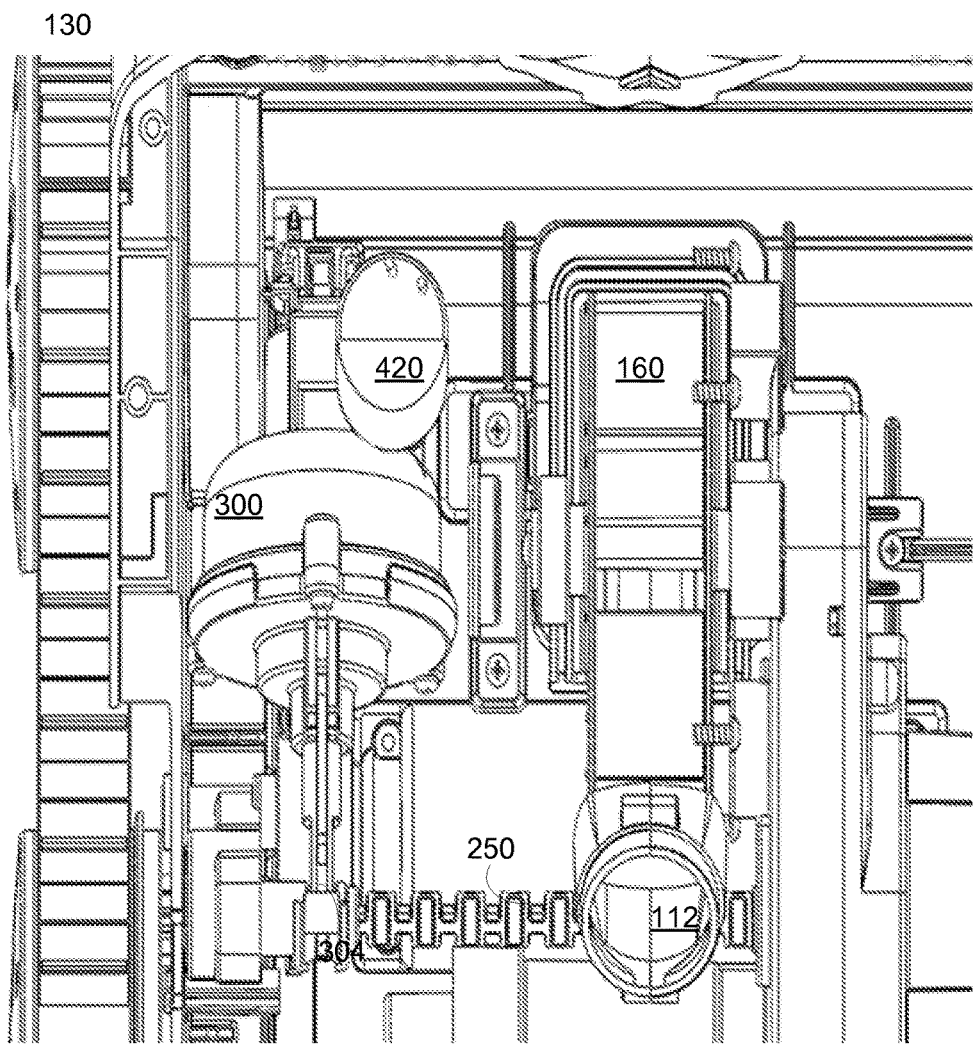
FIG. 16A is a cross sectional view of a robot taken along an imaginary horizontal plane according to the present invention.
Figure 16B:
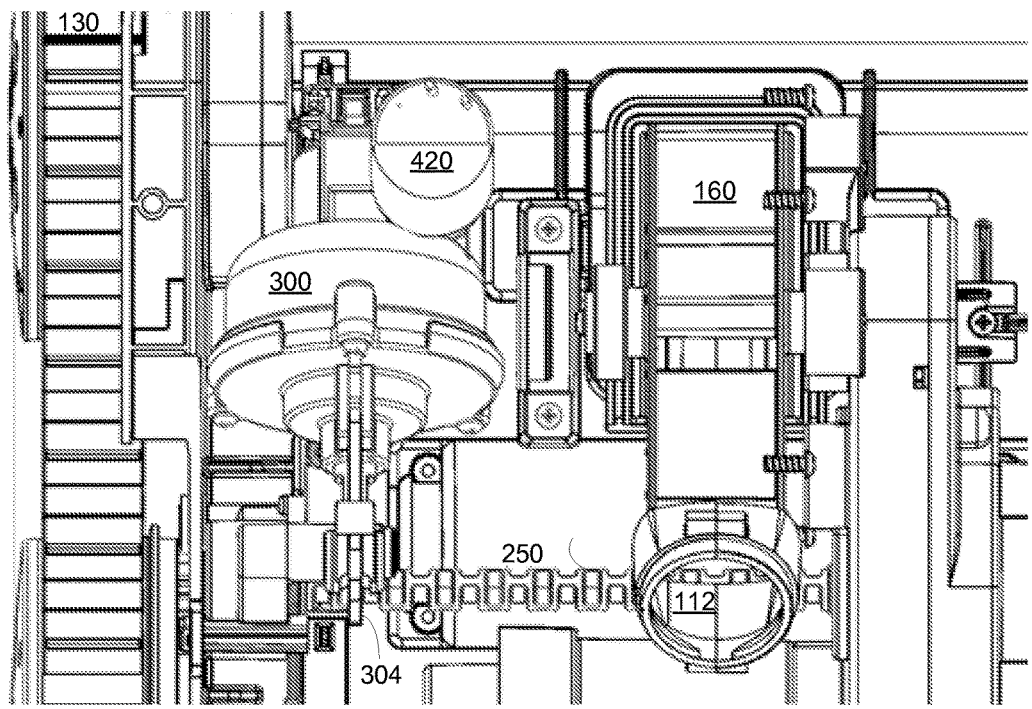
FIG. 16B is a cross sectional view of a robot taken along an imaginary horizontal plane according to the present invention.
Figure 17:
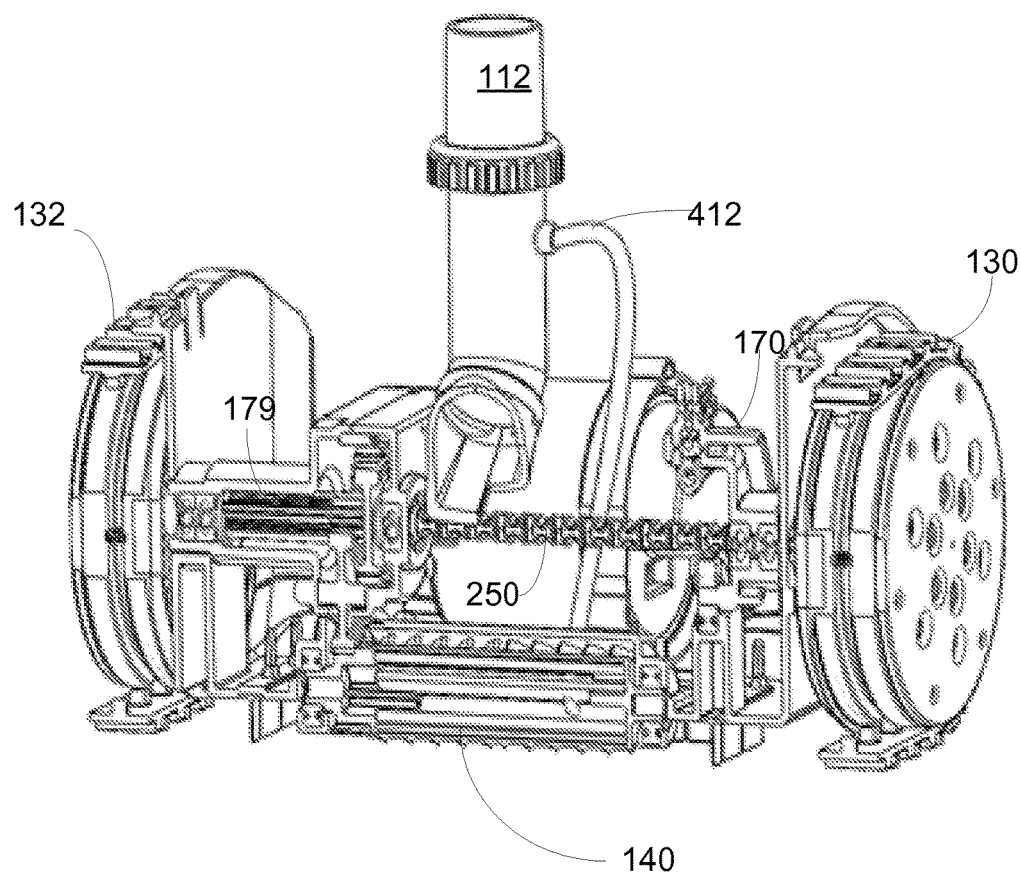
FIG. 17 is a cross sectional view of a robot taken along an imaginary vertical plane that is normal to the longitudinal axis of robot according to the present invention.
Figure 18:
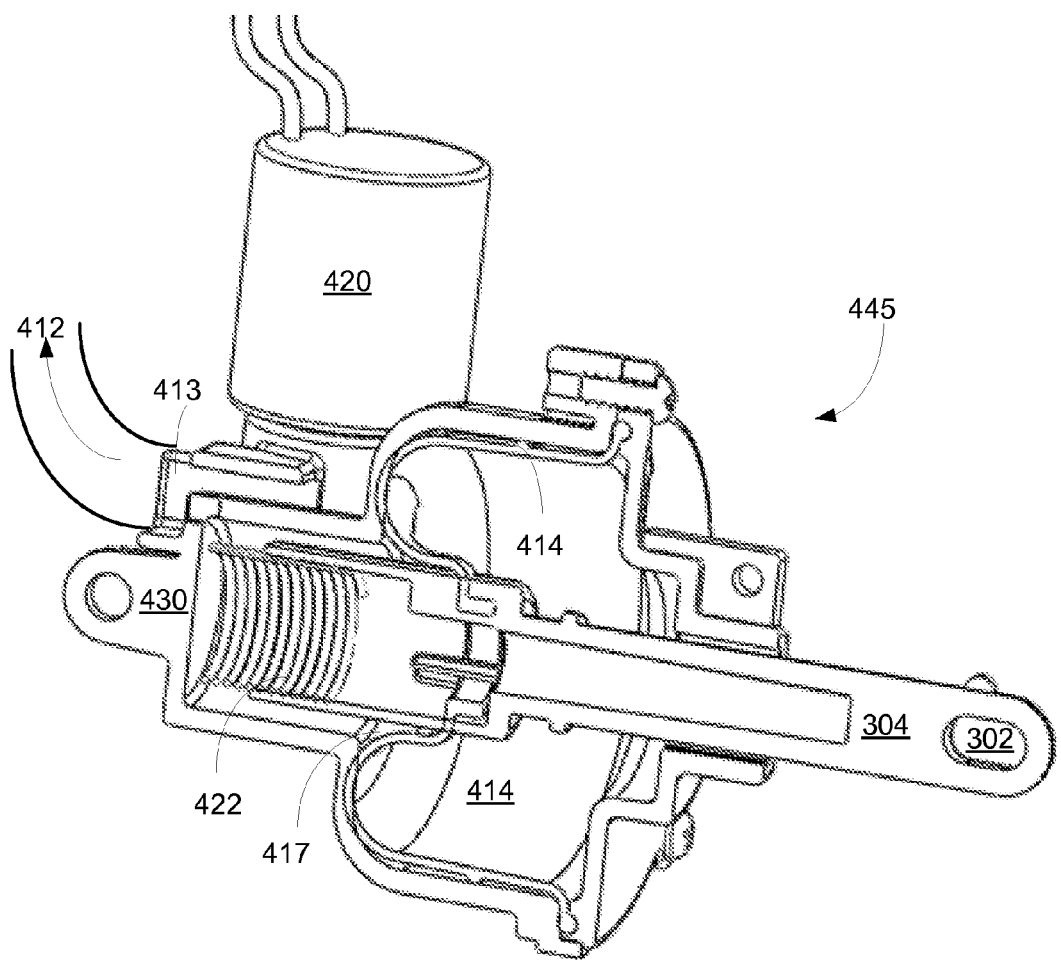
FIG. 18 is a cross sectional view of a piston and a piston controller according to the present invention.

FIGS. 16A and 16B also illustrate the two positions of the flexible axle 250 and of the piston 304.

Those skilled in the art to which this invention pertains will readily appreciate that numerous changes, variations and modifications can be made without departing from the scope of the invention mutatis mutandis.

We claim:

1. A suction-powered pool cleaning robot comprising: a fluid outlet, adapted for connection to a suction hose; a fluid inlet, with a fluid path between the fluid inlet and the fluid outlet; a turbine at least partially disposed within the fluid path so as to extract energy from flow of fluid through the fluid path; an electrical generator for providing power thereto and adapted to be driven by the turbine; a sensor arranged to generate rotation information indicative of a speed of rotation of the turbine; and an electronic controller that is arranged to control an operation of the suction-powered pool cleaning robot in response to at least the rotation information; wherein the electronic controller is arranged to trigger a rotation of the suction-powered pool cleaning robot if the rotation information indicates that the suction-powered pool cleaning robot attempts to climb a wall of the pool.

2. The suction-powered pool cleaning robot according to claim 1, wherein the electronic controller is arranged to trigger the rotation of the suction-powered pool cleaning robot by triggering a movement of a flexible axle that selects which gear out of a pair of gears will drive a driving wheel of the suction-powered pool cleaning, wherein the pair of gears rotate at opposite directions.

3. A suction-powered pool cleaning robot comprising: a fluid outlet, adapted for connection to a suction hose; a fluid inlet, with a fluid path between the fluid inlet and the fluid outlet; a turbine at least partially disposed within the fluid path so as to extract energy from flow of fluid through the fluid path; an electrical generator for providing power thereto and adapted to be driven by the turbine; a sensor arranged to generate rotation information indicative of a speed of rotation of the turbine;
an electronic controller that is arranged to control an operation of the suction-powered pool cleaning robot in response to at least the rotation information; and a suction sensor that is arranged to generate suction information indicative of suction applied via the suction hose;
wherein the electrical controller is arranged to update an expected inter-wall propagation rotational value in response to the suction information.

4. The suction-powered pool cleaning robot according to claim 3, wherein the electrical controller is arranged to update the expected inter-wall propagation rotational value in response an expected decline of the suction resulting from clogging of a filter of a device that applies the suction.

5. A suction-powered pool cleaning robot comprising: a fluid outlet, adapted for connection to a suction hose; a fluid inlet, with a fluid path between the fluid inlet and the fluid outlet; a turbine at least partially disposed within the fluid path so as to extract energy from flow of fluid through the fluid path; an electrical generator for providing power thereto and adapted to be driven by the turbine; a sensor arranged to generate rotation information indicative of a speed of rotation of the turbine;
an electronic controller that is arranged to control an operation of the suction-powered pool cleaning robot in response to at least the rotation information; and a suction sensor that is arranged to generate suction information indicative of suction applied via the suction hose;
wherein the electrical controller is arranged to compare the suction information and the rotation information and evaluate a status of the suction-powered pool cleaning robot suction-powered pool cleaning robot based upon a result of the comparison.

6. A suction-powered pool cleaning robot comprising: a fluid outlet, adapted for connection to a suction hose; a fluid inlet, with a fluid path between the fluid inlet and the fluid outlet; a turbine at least partially disposed within the fluid path so as to extract energy from flow of fluid through the fluid path; an electrical generator for providing power thereto and adapted to be driven by the turbine; a sensor arranged to generate rotation information indicative of a speed of rotation of the turbine; an electronic controller that is arranged to control an operation of the suction-powered pool cleaning robot in response to at least the rotation information; and a flexible axle that is movable between different first and second positions such as to cause the suction-powered pool cleaning robot to change a direction of propagation.

7. The suction-powered pool cleaning robot according to claim 6, comprising a hydraulic circuit that selectively provides suction, wherein a provision of suction causes the flexible axle to move to a first position and wherein a lack of provision of the suction to a diaphragm allows the flexible axle to move to the second position.

8. The suction-powered pool cleaning robot according to claim 7, wherein the hydraulic circuit is arranged to receive suction applied via the fluid outlet.

* * * * *